US007907733B2

(12) United States Patent
Cho et al.

(10) Patent No.: US 7,907,733 B2
(45) Date of Patent: Mar. 15, 2011

(54) METHOD FOR MANAGING TRAFFIC ENCRYPTION KEY IN WIRELESS PORTABLE INTERNET SYSTEM AND PROTOCOL CONFIGURATION METHOD THEREOF, AND OPERATION METHOD OF TRAFFIC ENCRYPTION KEY STATE MACHINE IN SUBSCRIBER STATION

(75) Inventors: Seok-Heon Cho, Iksan (KR); Sung-Cheol Chang, Daejeon (KR); Chul-Sik Yoon, Seoul (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd. (KR); Hanaro Telecom. Inc. (KR)

( * ) Notice: Subject to any disclaimer, the term of this patent is extended or adjusted under 35 U.S.C. 154(b) by 736 days.

(21) Appl. No.: 10/591,625

(22) PCT Filed: Mar. 4, 2005

(86) PCT No.: PCT/KR2005/000615
§ 371 (c)(1),
(2), (4) Date: Jul. 30, 2007

(87) PCT Pub. No.: WO2005/086412
PCT Pub. Date: Sep. 15, 2005

(65) Prior Publication Data
US 2008/0080713 A1    Apr. 3, 2008

(30) Foreign Application Priority Data

Mar. 5, 2004 (KR) .................. 10-2004-0015162
Jun. 22, 2004 (KR) .................. 10-2004-0046756
Nov. 29, 2004 (KR) .................. 10-2004-0098527

(51) Int. Cl.
*H04K 1/00* (2006.01)
*H04L 9/00* (2006.01)
*H04L 9/08* (2006.01)

(52) U.S. Cl. .................. 380/273; 380/264; 380/278

(58) Field of Classification Search .................. 380/273, 380/278, 264
See application file for complete search history.

(56) References Cited

U.S. PATENT DOCUMENTS 6,510,515 B1    1/2003    Raith
(Continued)

FOREIGN PATENT DOCUMENTS

JP    2002-518935    6/2002
(Continued)

OTHER PUBLICATIONS

Waldvogel et al., The Versakey Framework: Versatile Group Key Management, IEEE Journal on Selected Areas in Communications, vol. 17, No. 9, Sep. 1999, pp. 1614-1631.
(Continued)

*Primary Examiner* — Shin-Hon Chen
(74) *Attorney, Agent, or Firm* — The Farrell Law Firm, P.C.

(57) ABSTRACT

Disclosed is a traffic encryption key (TEK) management method for automatically generating a TEK for a multicast or broadcast service by a base station to periodically update a TEK used by a subscriber station. The base station transmits the first Key Update Command message for updating a group key encryption key (GKEK) for encrypting the TEK and the second Key Update Command message for updating the TEK to the subscriber station to update the TEK. The base station establishes an M & B TEK Grace Time which is different from a TEK Grace Time established by the subscriber station, transmits the first message including a new GKEK to the subscriber station through a primary management connection before the M & B TEK Grace Time, and transmits the second message including a new TEK encrypted with the new GKEK thereto through a broadcast connection after the M & B TEK Grace Time.

45 Claims, 24 Drawing Sheets

U.S. PATENT DOCUMENTS

| | | | |
|---|---|---|---|
| 2003/0123669 A1 | 7/2003 | Koukoulidis et al. | |
| 2005/0047598 A1* | 3/2005 | Kruegel | 380/264 |
| 2005/0047600 A1* | 3/2005 | Newkirk | 380/278 |
| 2007/0143600 A1* | 6/2007 | Kellil et al. | 713/163 |

FOREIGN PATENT DOCUMENTS

| | | |
|---|---|---|
| JP | 2002-247022 | 8/2002 |
| JP | 2004-532554 | 10/2004 |
| WO | WO 02/080449 | 10/2002 |

OTHER PUBLICATIONS

IEEE Security & Privacy Magazine; Overview of IEEE 802.16 Security, May/Jun. 2004, pp. 40-48.

Eklund et al., IEEE Standard 802.16: A Technical Overview of The Wirelessman Air Interface for BroadBand Wireless Access, IEEE Communications Magazine, Jun. 2002, pp. 98-107.

* cited by examiner

FIG. 7

| System | Name | Description | Minimum value | Default value | Maximum value |
|---|---|---|---|---|---|
| BS | M&B TEK Grace Time | Time prior to TEK (for the multicast and broadcast traffic service) expiration BS begins rekeying. This time is longer than the TEK Grace Time. | Vendor-specific value | Vendor-specific value | Vendor-specific value |

FIG. 11

| CID(MAC Header) | Key to encrypt the TEK |
|---|---|
| Primary Management CID | KEK(Derived from the AK) |
| Broadcast CID | Old distributed TEK |

FIG. 14

| Attributes | Contents |
|---|---|
| Key-Sequece-Number | Authorization Key sequence number |
| SAID | Security Association ID |
| TEK-Parameters | "Older" generation of key parameters relevant to SAID |
| TEK-Parameters | "Newer" generation of key parameters relevant to SAID |
| HMAC-Digest | Keyed SHA message digest |

FIG. 15

| Attributes | Contents |
|---|---|
| GKEK | GKEK, encrypted with the AK |
| TEK | TEK, encrypted wity the GKEK (Multicast or Broadcast Service) or encrypted with the KEK (Unicast Service) |
| Key-Lifetime | TEK Remaining Lifetime |
| Key-Sequence-Number | TEK Sequence Number |
| CBC-IV | Cipher Block Chaining (CBC) Initialization Vector |

FIG. 16

| Attributes | Contents | 1st Message (Primary) | 2nd Message (Braodcast) |
|---|---|---|---|
| Key-Sequence-Number | Authorization key sequence number | O | O |
| SAID | Security Association ID | O | O |
| Key Push Modes | Usage code of Key Update Command message | O | O |
| Key Push Counter | Counter one greater than that of older generation for reply attack | O | O |
| TEK-Parameters | "Newer" generation of key parameters relevant to SAID | | |
| > GKEK | GKEK, encrypted with the AK | O | × |
| > TEK | TEK, encrypted with the GKEK(Multicast or Broadcast Service) | × | O |
| > Key-Lifetime | TEK Remaining Lifetime | O | O |
| > Key-Sequence-Number | TEK Sequnce Number | × | O |
| > CBS-IV | Cipher Block Chaining (CBC) Initialization Vector | × | O |
| HMAC-Digest | Keyed SHA message digest | O | O |

FIG. 17

| Type | Length | Value |
|---|---|---|
| 30 | 1 | 0, GKEK update mode (1st Message)<br>1, TEK update mode (2nd Message)<br>2-225, reserved |

FIG. 18

| Key push modes | Input Key |
|---|---|
| GKEK update mode | AK |
| TEK update mode | GKEK |

FIG. 20

| Situation | Transferred TEK-parameter information |
|---|---|
| Initial TEK response (before ⓐ) | TEK-parameters $_C$ |
| Initial TEK response (after ⓐ) | TEK-parameters $_C$ & TEK-parameters $_N$ |
| Initial update response (after ⓑ) | TEK-parameters $_N$ |

C : Current generation of key parameters relevant to SAID
N : Next generation of key parameters relevant to SAID

Fig. 22

| State<br>Event or Rcvd Message | (A)<br>Start | (B)<br>Op Wait | (C)<br>Op Reauth Wait | (D)<br>Op | (E)<br>Rekey Wait | (F)<br>Rekey Reauth Wait |
|---|---|---|---|---|---|---|
| (1) Stop | | Start | Start | Start | Start | Start |
| (2) Authorized | Op Wait | | | | | |
| (3) Auth Pend | | Op Reauth Wait | | | Rekey Reauth Wait | |
| (4) Auth Comp | | | Op Wait | | | Rekey Wait |
| (5) TEK Invalid | | | | Op Wait | | Op Reauth Wait |
| (6) Timeout | | Op Wait | | Rekey Wait | | |
| (7) TEK Refresh Timeout | | | | Operational | | |
| (8) Key Reply | | Operational | | | Operational | |
| (9) Key Reject | | Start | | | Start | |

Fig. 24

| State<br>Event or Rcvd Message | (A)<br>Start | (B)<br>Op Wait | (C)<br>Op Reauth Wait | (D)<br>Op | (E)<br>Rekey Wait | (F)<br>Rekey Reauth Wait | (G)<br>M&B rekey Interim Wait |
|---|---|---|---|---|---|---|---|
| (1) Stop | | Start | Start | Start | Start | Start | |
| (2) Authorized | Op Wait | | | | | | |
| (3) Auth Pend | | Op Reauth Wait | | | Rekey Reauth Wait | | |
| (4) Auth Comp | | | Op Wait | | | Rekey Wait | |
| (5) TEK Invalid | | | | Op Wait | Op Wait | Op Reauth Wait | |
| (6) Timeout | | Op Wait | | Rekey Wait | Rekey Wait | | Rekey Wait |
| (7) TEK Refresh Timeout | | Operational | | | Operational | | |
| (8) Key Reply | | Start | | | Start | | |
| (9) Key Reject | | | | Rekey Wait | | | |
| (10) GKEK Updated | | | | | | | |
| (11) TEK Updated | | | | | | | Operational |

METHOD FOR MANAGING TRAFFIC ENCRYPTION KEY IN WIRELESS PORTABLE INTERNET SYSTEM AND PROTOCOL CONFIGURATION METHOD THEREOF, AND OPERATION METHOD OF TRAFFIC ENCRYPTION KEY STATE MACHINE IN SUBSCRIBER STATION

TECHNICAL FIELD

The present invention relates to a method for managing a traffic encryption key (TEK) in a wireless portable Internet system. More specifically, the present invention relates to a method for managing a traffic encryption key for a multicast service and a broadcast service, a method for configuring a protocol thereof, and a method for operating a traffic encryption key state machine in a subscriber station in the wireless portable Internet system.

BACKGROUND ART

The wireless portable internet system is a next generation communication system providing further mobility to short-distance data communication using a stationary access point in a like manner of a wireless local area network (LAN). One of various international standards for the wireless portable internet system has been suggested by the IEEE 802.16e working group. The IEEE 802.16, which is the standards for the metropolitan area network (MAN), represents a data communication network for the intermediate area between the local area network (LAN) and the wide area network (WAN).

To safely provide services, the IEEE 802.16 wireless MAN system has defined an encryption function for traffic data which has become an essential requirement for stability of services and networks.

To encrypt the traffic data, the IEEE 802.16 wireless MAN system has defined a method for generating a traffic encryption key and distributing one. To maintain the security of the traffic encryption key, the wireless MAN system has established a scheme for updating and distributing the traffic encryption key per a predetermined time. A subscriber station and a base station accordingly share the same traffic encryption key.

To perform an authentication function and a security function, the subscriber station and the base station use a Privacy Key Management Request (PKM-REQ) message and a Privacy Key Management Response (PKM-RSP) message. The subscriber station transmits a Key Request message included in the PKM-REQ message to the base station to request an allocation of a new traffic encryption key or an update of a traffic encryption key. The base station receives the Key Request message from the subscriber station, transmits a Key Reply message included in the PKM-RSP message to the subscriber station when the request of a new traffic encryption key from the subscriber station is appropriate, and transmits a Key Reject message or an Auth Invalid message to the subscriber station when the request from subscriber station is inappropriate. The wireless MAN system uses the traffic encryption key shared between both the subscriber station and the base station to encrypt or decrypt traffic data in the radio channel and to transmit or receive the encrypted or decrypted traffic data.

In addition, a method for updating a traffic encryption key for the multicast service or the broadcast service in the IEEE 802.16 wireless MAN system corresponds to the above-described method for updating the traffic encryption key for the unicast service. In detail, all subscriber stations request to update a traffic encryption key from the base station, the base station individually provides the same updated traffic encryption key to all requesting subscriber stations. If the traffic encryption key update procedure for the multicast service or the broadcast service uses the same procedure defined for the unicast service, then the system's loads caused by occupying the radio channel are substantially increased, and the radio resources are unnecessarily wasted. Therefore, it is needed to provide a new method for efficiently reducing the undesired usage of radio resources caused by the above-noted traffic encryption key update process.

DISCLOSURE

Technical Problem

It is an advantage of the present invention to provide a method for managing an traffic encryption key for a multicast service and a broadcast service, a method for configuring a protocol thereof, and a method for operating a traffic encryption key state machine in a subscriber station in the wireless portable Internet system for reducing base station's loads by automatically updating a traffic encryption key and transmitting one to the subscriber station through a broadcast channel.

Technical Solution

In one aspect of the present invention, a method for a base station to manage a traffic encryption key for encryption of traffic data for a multicast service or a broadcast service provided to a subscriber station in a wireless portable Internet system comprises: (a) generating a new traffic encryption key so as to update a current traffic encryption key when a predetermined time elapses from a start time of an active lifetime of the current traffic encryption key used for encrypting traffic data currently transmitted to the subscriber station; and (b) transmitting the new traffic encryption key to subscriber stations provided with the multicast service or the broadcast service through a broadcast connection.

In another aspect of the present invention, a method for a base station to manage a traffic encryption key for encryption of traffic data for a multicast service or a broadcast service provided to a subscriber station in a wireless portable Internet system comprises: (a) generating a specific key for encrypting or decrypting a traffic encryption key before a predetermined time elapses from a start time of an active lifetime of the current traffic encryption key used for encrypting traffic data currently transmitted to the subscriber station; (b) transmitting the specific key to subscriber stations receiving the multicast service or the broadcast service through a primary management connection; (c) generating a new traffic encryption key so as to update the current traffic encryption key when the predetermined time elapses from a start time of an active lifetime of the current traffic encryption key; and (d) transmitting the new traffic encryption key to subscriber stations receiving the multicast service or the broadcast service through a broadcast connection to update a traffic encryption key used by the subscriber station.

In still another aspect of the present invention, a method for a subscriber station to manage a traffic encryption key for decryption of traffic data for a multicast service or a broadcast service received from a base station in a wireless portable Internet system comprises: (a) receiving a new traffic encryption key from the base station through a broadcast connection; and (b) updating a current traffic encryption key with the new traffic encryption key, and using the new traffic encryption key to decrypt traffic data received from the base station.

In still yet another aspect of the present invention, a method for a subscriber station to manage a traffic encryption key for decryption of traffic data for a multicast service or a broadcast service received from a base station in a wireless portable Internet system: comprises (a) receiving a new specific key for decrypting a traffic encryption key from the base station through a Primary Management Connection, the new specific key being encrypted with an Authorization Key (AK) allocated when the subscriber station is authenticated; (b) updating a current specific key with the new specific key; (c) receiving a new traffic encryption key from the base station through a broadcast connection, the new traffic encryption key being encrypted with the new specific key; and (d) decrypting the new traffic encryption key with the new specific key to update the current traffic encryption key, and using the updated traffic encryption key to decrypt traffic data received from the base station.

In still further another aspect of the present invention, a method for configuring a protocol for managing a traffic encryption key for encryption or decryption of traffic data for a multicast service or a broadcast service transmitted and received between a subscriber station and a base station in a wireless portable Internet system: comprises (a) the subscriber station using a MAC message to transmit a Key Request message to the base station and request a traffic encryption key; (b) the base station using the MAC message to transmit a Key Reply message including the requested traffic encryption key and a specific key to the subscriber station, the specific key being encrypted with an Authorization Key allocated to the subscriber station and being used to encrypt the traffic encryption key; (c) the base station using the MAC message to transmit the first Key Update Command message including a new specific key to the subscriber station so as to update the specific key; and (d) the base station using the MAC message to transmit the second Key Update Command message including a new traffic encryption key, encrypted by the new specific key, to the subscriber station.

In still further another aspect of the present invention, an operation method of a traffic encryption key state machine provided to a subscriber station and used for the subscriber station to manage a traffic encryption key for decrypting traffic data received from a base station for a multicast service or a broadcast service, comprises: transmitting a Key Request message to the base station according to generation of a traffic encryption key request event and then entering an Op Wait state; and controlling an Operational state to receive the traffic data from the base station, wherein the traffic encryption key state machine goes to the Operational state and starts a predetermined operation when a subscriber station in an Op Wait state receives a Key Reply message including a new traffic encryption key from the base station.

In still further another aspect of the present invention, an operation method of a traffic encryption key state machine existing in a subscriber station and used for the subscriber station to manage a traffic encryption key for decrypting traffic data received from a base station for a multicast service or a broadcast service, comprises: transmitting a Key Request message to the base station according to generation of a traffic encryption key request event and then entering an Op Wait state; controlling an Operational state to receive the traffic data from the base station; and controlling a M&B (Multicast and Broadcast) Re-key Interim Wait state to momentarily wait for by using a new traffic encryption key automatically generated and transmitted by the base station, wherein when the subscriber station receives a Key Reply message from the base station in the Op Wait state, the traffic encryption key state machine goes to the Operational state and starts a predetermined operation, when the subscriber station receives a new specific key from the base station through a first Key Update Command message in the Operational state so as to update the specific key, a GKEK Updated event is generated and the traffic encryption key state machine goes to the M&B Re-key Interim Wait state by a GKEK Updated event, and when the subscriber station receives a second Key Update Command message for distributing a new traffic encryption key encrypted with the new specific key from the base station through a broadcast connection in the M&B Re-key Interim Wait state, a TEK Updated event is generated and the traffic encryption key state machine goes to the Operational state by a TEK Updated event.

DESCRIPTION OF DRAWINGS

FIG. 7 shows a table for an operational range of encryption-related PKM parameters for updating the traffic encryption key in a wireless portable Internet system according to the first and the second exemplary embodiment of the present invention;

FIG. 11 shows a table for relationship between CIDs of a MAC header and corresponding input keys for encrypting a traffic encryption key when the traffic encryption key is distributed according to a traffic encryption key management method in the wireless portable Internet system according to the first exemplary embodiment of the present invention;

FIG. 14 shows a table for parameters of a Key Reply message used for managing a traffic encryption key in a wireless portable Internet system according to the second exemplary embodiment of the present invention;

FIG. 15 shows a table for TEK parameters shown in FIG. 14;

FIG. 16 shows a table for parameters of a Key Update Command message used for managing a traffic encryption key in a wireless portable Internet system according to the second exemplary embodiment of the present invention;

FIG. 17 shows a table for the Key Push Modes parameter shown in FIG. 16;

FIG. 18 shows a table for input keys used for generating an HMAC-Digest parameter shown in FIG. 16;

FIG. 20 shows a table for information on TEK parameters included in the Key Reply message, transmitted by a base station in response to a request of a traffic encryption key by a subscriber station, in an abnormal case shown in FIG. 19;

FIG. 22 shows a table for the state transition shown in FIG. 21;

FIG. 24 shows a table for the state transition shown in FIG. 23.

BEST MODE

Figure 1:
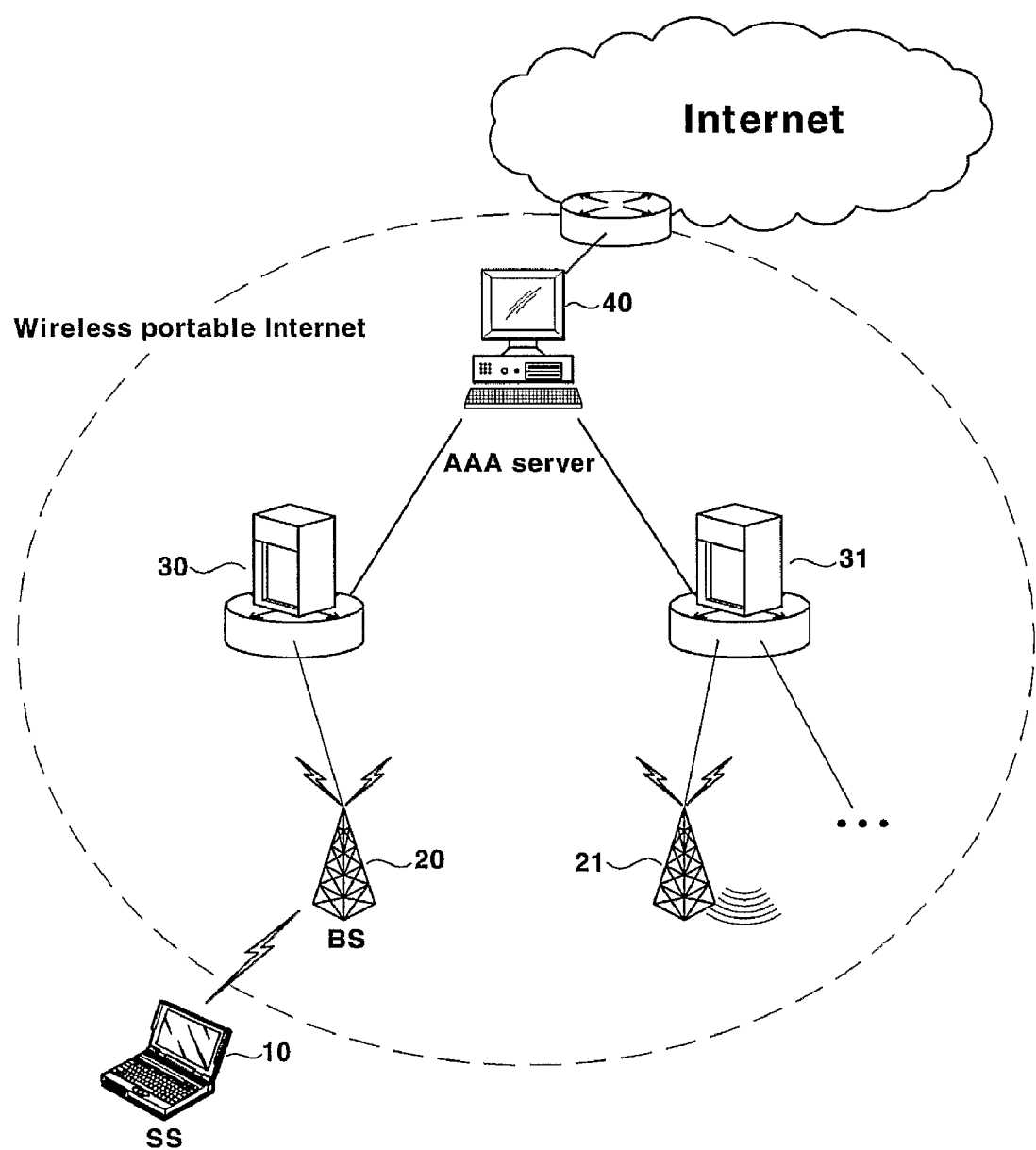
FIG. 1 shows a schematic diagram of a wireless portable Internet system according to an exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

A method for managing a traffic encryption key in a wireless portable Internet system will be described in detail with reference to drawings.

FIG. 1 shows a schematic diagram of a wireless portable Internet system according to an exemplary embodiment of the present invention.

As shown, the wireless portable Internet system includes a subscriber station 10, base stations 20 and 21 for communicating with the subscriber station 10, routers 30 and 31 connected to the base stations 20 and 21 through a gateway, and an authentication authorization and accounting (AAA) server 40 being connected to the routers 30 and 31 and authenticating the subscriber station 10.

The conventional wireless LAN system including the IEEE 802.11 provides short-distance radio data communication with reference to a stationary access point, which does not provide mobility of subscriber station but supports short-distance radio data communication.

The wireless portable Internet system progressed by the IEEE 802.16 working group guarantees mobility and provides a seamless data communication service when the subscriber 10 moves to another cell from the current cell, thereby supporting a handover of the subscriber station 10 and a dynamic allocation of an IP address according to movements of the subscriber station.

The communication system executed between the subscriber station 10 and the base stations 20 and 21 is the orthogonal frequency division multiplex access (OFDMA) system which has combined the frequency division multiplexing (FDM) system and the time division multiplexing (TDM) system, is strong against fading generated in the multi-path, and has high data rates.

Figure 2:
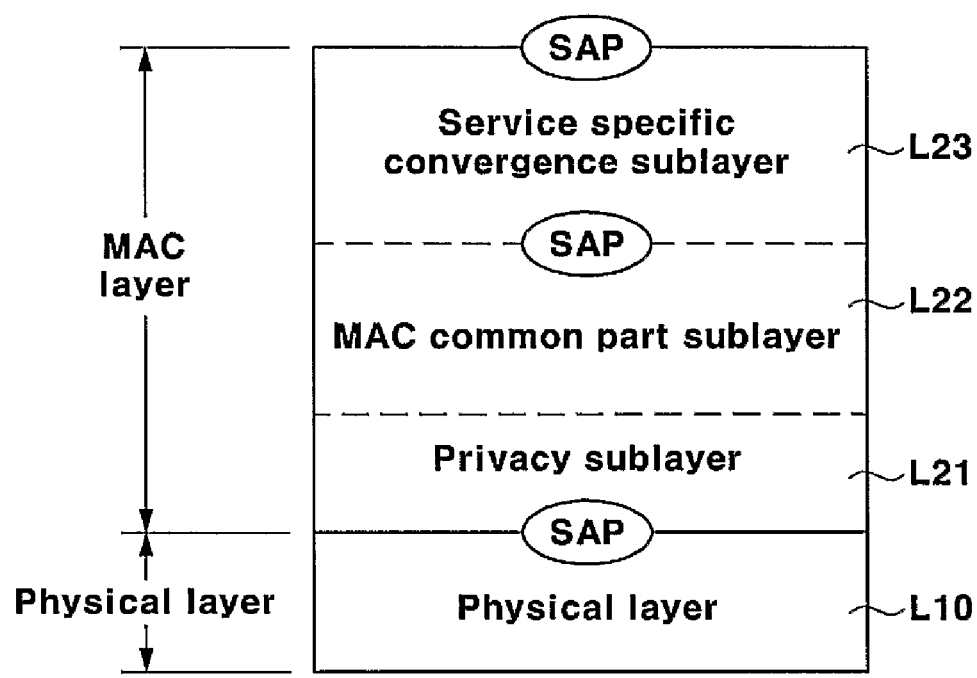
FIG. 2 shows a layered protocol structure of the wireless portable Internet system shown in FIG. 1.

FIG. 2 shows a diagram for a layered protocol structure of the IEEE 820.16 wireless portable Internet system including a physical layer L10 and media access control (MAC) layers L21, L22, and L23.

The physical layer L10 performs a radio communication functions including modulation/demodulation and coding/decoding performed by a normal physical layer. According to the IEEE 802.16e, the wireless portable Internet system does not have function-specific MAC layers in a like manner of a wired Internet system, but has a single MAC layer in charge of other different functions. The MAC layer includes a privacy sublayer L21, a MAC common part sublayer L22, and a service specific convergence sublayer L23.

The privacy sublayer L21 performs functions of equipment or user authentication and security key exchange, and encryption. The device is authenticated by the privacy sublayer L21, and the users are authenticated by an upper layer of the MAC (not illustrated).

The MAC common part sublayer L22 is the core of the MAC layer which is in charge of system access, bandwidth allocation, traffic connection establishment and maintenance, and QoS control.

The service specific convergence sublayer L23 performs functions of payload header suppression and QoS mapping in the seamless data communication.

Figure 3:
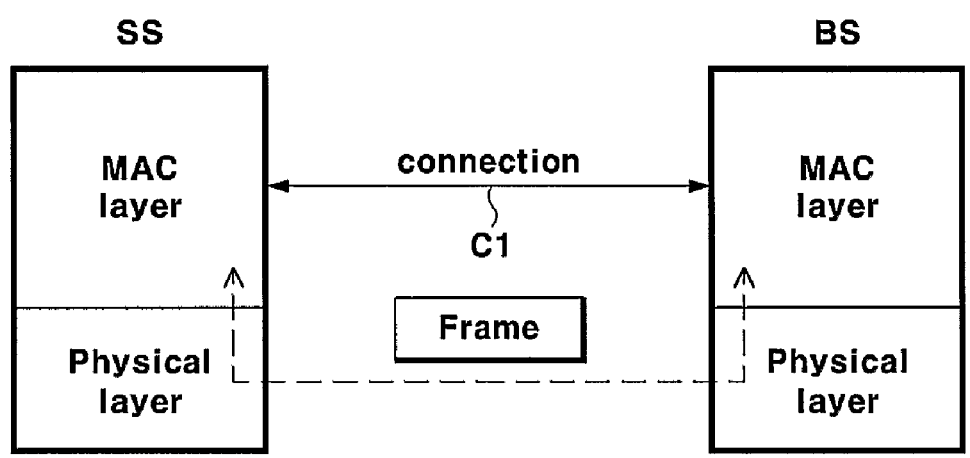
FIG. 3 shows schematic diagram of a connection between a base station and a subscriber station in the wireless portable Internet system shown in FIG. 1.

FIG. 3 shows a schematic of a traffic connection structure between the base stations 20 and 21 and a subscriber station 10 in the wireless portable Internet system according to an exemplary embodiment of the present invention. A connection of C1 is provided between the MAC layers of the subscriber station 10 and the base stations 20 and 21. The term "connection C1" as used herein does not refer to a physical connection but a logical connection that is defined as a mapping relationship between the MAC peers of the subscriber station 10 and the base stations 20 and 21 for traffic transmission of one service flow.

Hence, the connection is managed through messages and parameters, and the functions are performed by the signal messages or traffic data transmitted through the connection.

A MAC message includes a REQ message, a RSP message, and an ACK message.

Figure 4:
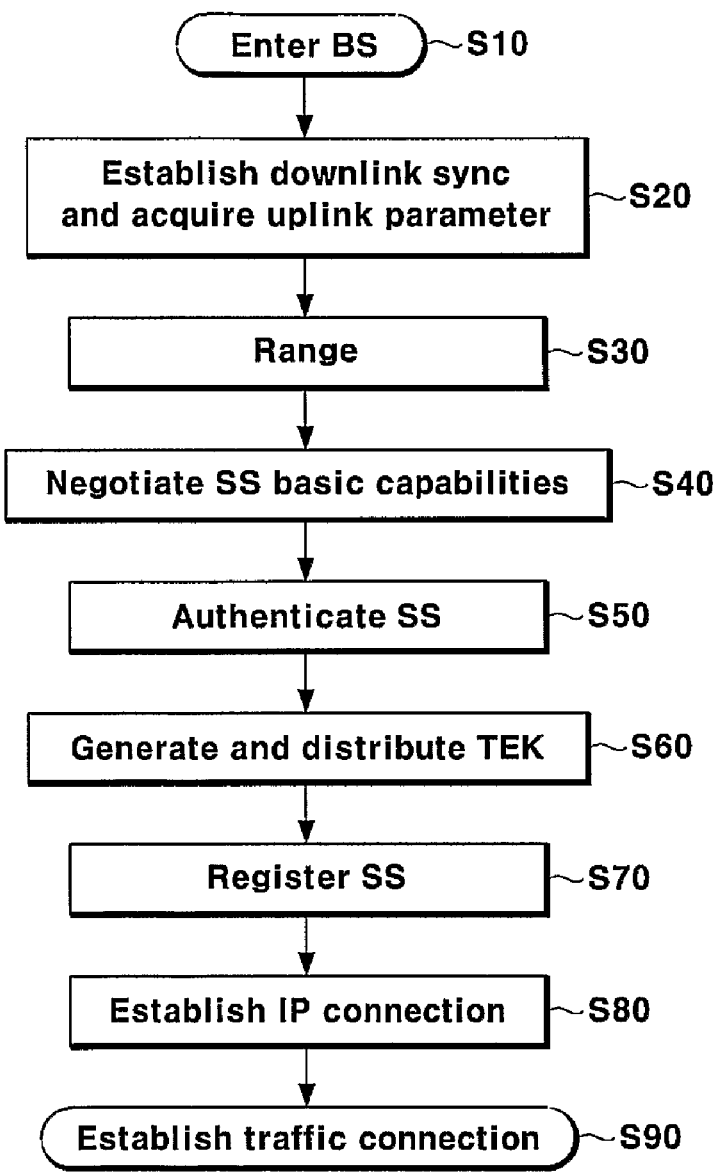
FIG. 4 shows a flowchart for establishing a traffic connection between a base station and a subscriber station in the wireless portable Internet system shown in FIG. 1.

FIG. 4 shows a flowchart for establishing a traffic connection between a base station and a subscriber station in the wireless portable Internet system shown in FIG. 1.

Referring to FIG. 4, when the subscriber station 10 enters an area of the base station 20 in step S10, the subscriber station 10 establishes downlink synchronization with the base station 20 and acquires an uplink parameter in step S20. For example, the parameter includes a channel descriptor message which follows a characteristic of the physical layer (e.g., the signal to noise ratio (SNR)).

The subscriber station 10 and the base station 20 perform a ranging process in step S30 to perform initial ranging in the earlier stage and perform periodic ranging based on the CDMA codes (the ranging process corrects timing, power, and frequency information between the subscriber station 10 and the base station 20).

The base station 20 negotiates subscriber station's basic capabilities with the subscriber station 10 in step S40, and authenticates the subscriber station 10 by using a certificate of the subscriber station 10 in step S50.

When the subscriber station 10 is authorized to access the wireless portable Internet, the base station generates a traffic encryption key and distributes one to the subscriber station for each connection of C1 in step S60 in order to share the traffic encryption key with the subscriber station. The base station 20 negotiates MAC functions of the subscriber station and registers the functions in step S70, and provides an IP address to the subscriber station 10 through a DHCP server or an MIP server to establish an IP connection in step S80, and the base station 20 establishes a traffic connection with the subscriber station 10 for each service flow in step S90 so that the base station may provide a traffic service to the subscriber station having an IP address.

Therefore, the subscriber stations receive a traffic encryption key from the base station so as to receive a multicast service or a broadcast service each of which has an individual traffic encryption key for encrypting service traffic data. That is, the traffic encryption keys assigned to the different multicast services are different from each other, and the traffic encryption keys assigned to multicast services are different from a traffic encryption key for the broadcast service so that a subscriber station should not receive another multicast service and subscriber stations should be prevented from receiving broadcast services from other service providers.

Figure 5:
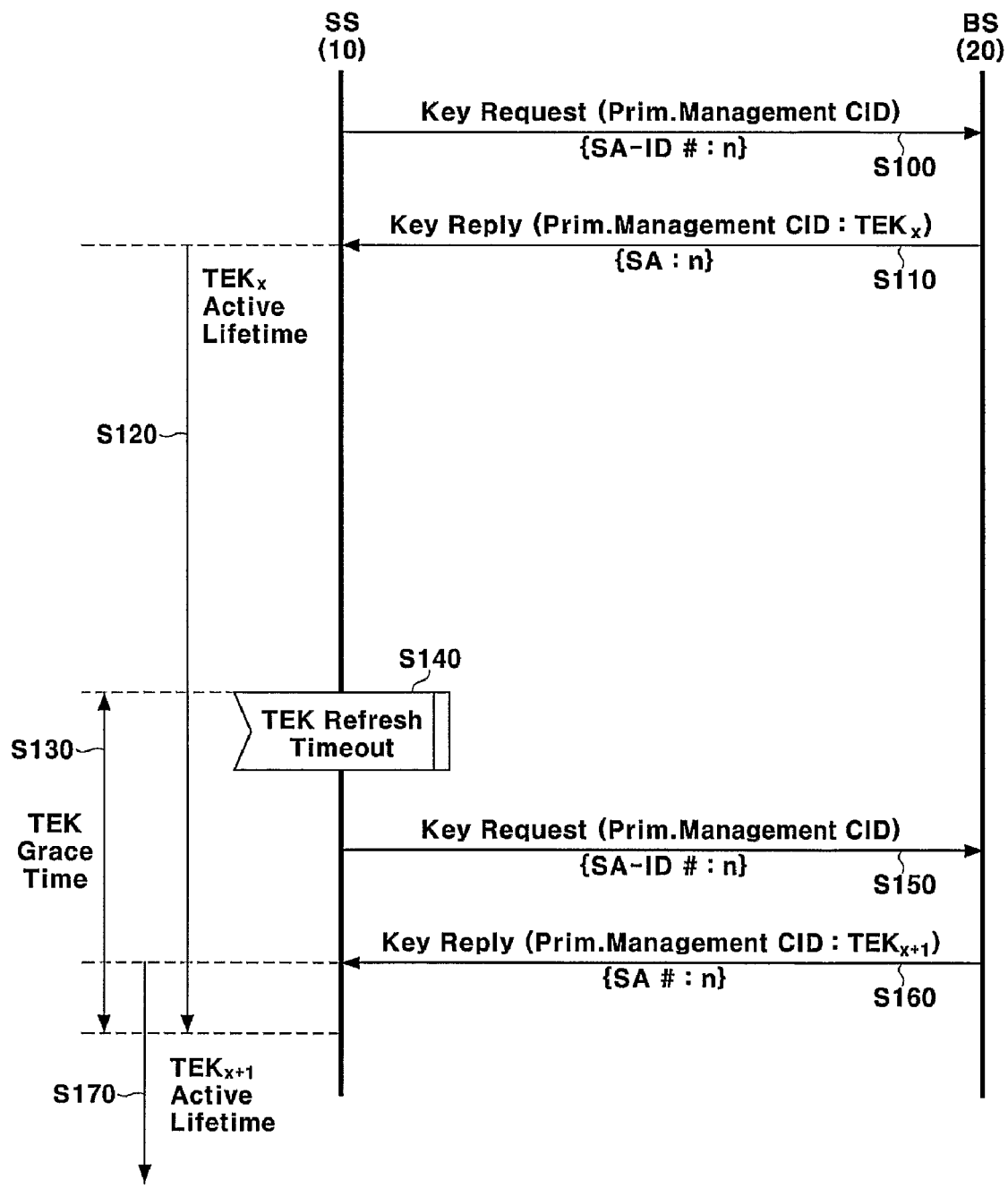
FIG. 5 shows a flowchart of a current method for managing a traffic encryption key in a general wireless portable Internet system.

FIG. 5 shows a flowchart for managing a traffic encryption key in a general wireless portable Internet system.

Referring to FIG. 5, the subscriber station 10 transmits a Key Request message (a PKM-REQ message) to the base station in step S100 in order to receive a traffic encryption key for one of the multicast service and the broadcast service from the base station. The Key Request message is used to request generation and distribution of the new traffic encryption key.

A set of parameters for representing a traffic encryption key, a traffic encryption key sequence number, a traffic encryption key lifetime, and an encryption algorithm is defined to be a security association (SA) which includes a security association-identification (SA-ID) as an identifier. Each of the multicast service or the broadcast relates to a different SA. In detail, the subscriber stations receiving the same multicast service have the same single SA information and the other subscriber stations receiving the same broadcast service have the same single SA information, but the two kinds of SA information do not correspond to each other. Therefore, the Key Request message includes an SA-ID (an identifier of the SA related to the corresponding service), and the subscriber station requests a traffic encryption key corresponding to the $n^{th}$ SA-ID and information corresponding to the traffic encryption key from the base station 20.

Also, a MAC header of the Key Request message transmitted to the base station 20 from the subscriber station 10 includes a Primary Management CID for a primary management connection. The base station 20 allocates a specific Primary Management CID to the subscriber station 10 to thus identify the subscriber station 10 each time the subscriber station 10 initially accesses the base station 20.

When receiving the Key Request message from the subscriber station 10, the base station 20 uses field values of the Key Request message, generates an $x^{th}$ traffic encryption key $TEK_x$ through a traffic encryption key generation algorithm, and transmits one to the subscriber station 10 through a Key Reply message in step S110. In this instance, the base station 20 in the Key Reply message since the subscriber station 10 has requested the $n^{th}$ SA. The base station 20 applies the same Primary Management CID included in the MAC header of the Key Request message to the MAC header of the Key Reply message since the base station must transmit the traffic encryption key to the subscriber station which has requested the traffic encryption key. The process for the subscriber station 10 to initially receive a traffic encryption key for the multicast service or the broadcast service is accordingly finished.

The subscriber station 10 uses the $x^{th}$ traffic encryption key on the $n^{th}$ SA generated by the base station to decrypt the traffic data of the corresponding service. In addition, when the subscriber station 10 receives the traffic encryption key from the base station 20 through the Key Reply message, a TEK Active Lifetime of the corresponding traffic encryption key is started in step S120.

The subscriber station 10 manages a TEK Grace Time in order to periodically update the traffic encryption key and thus receive a seamless and stable traffic service. The TEK Grace Time represents a time at which the subscriber station 10 requests an update of the traffic encryption key before the traffic encryption key is expired. Hence, the subscriber station 10 generates a TEK Refresh Timeout event in step S140 when the TEK Grace Time is operated in step S130. A traffic encryption key state machine for executing the TEK Refresh Timeout event is installed in the subscriber station 10.

The subscriber station 10 transmits a Key Request message to the base station in step S150. In this instance, the Key Request message includes an SA-ID and a Primary Management CID corresponding to those of the Key Request message of the previous step S100.

In a like manner, when receiving the Key Request message from the subscriber station 10, the base station 20 generates an $(x+1)^{th}$ traffic encryption key $TEK_{x+1}$ as a reply message, includes the traffic encryption key in the Key Reply message, and transmits that message to the subscriber station 10 in step S160. In this instance, the same Primary Management CID used for the MAC header of the Key Reply message of the previous step S110 is included in the MAC header of the Key Reply message, and an $n^{th}$ SA is included in the Key Reply message since the SA-ID value of the Key Request message of the previous step S150 is given to be n. The $n^{th}$ SA includes the $(x+1)^{th}$ traffic encryption key $TEK_{x+1}$, differing from the previous step S110.

The $TEK_{x+1}$ Active Lifetime is started in step S170 when the subscriber station 10 receives the $(x+1)^{th}$ traffic encryption key $TEK_{x+1}$ from the base station 20 through the Key Reply message. The subscriber station decrypts subsequent service data by using the $(x+1)^{th}$ traffic encryption key. The process for updating and distributing the traffic encryption key for the multicast service or the broadcast service is accordingly finished and repeated.

In the case of updating the traffic encryption key supported by the wireless portable Internet system such as the IEEE 802.16 wireless MAN system, the 26-byte Key Request message is transmitted to the base station 20 by the subscriber station 10 and the 84-byte Key Reply message is transmitted to the subscriber station 10 by the base station 20, and hence, the total of 110-byte signal messages are used between a base station 20 and one subscriber station 10 for the purpose of update and distribution for maintaining the traffic encryption key.

Figure 6:
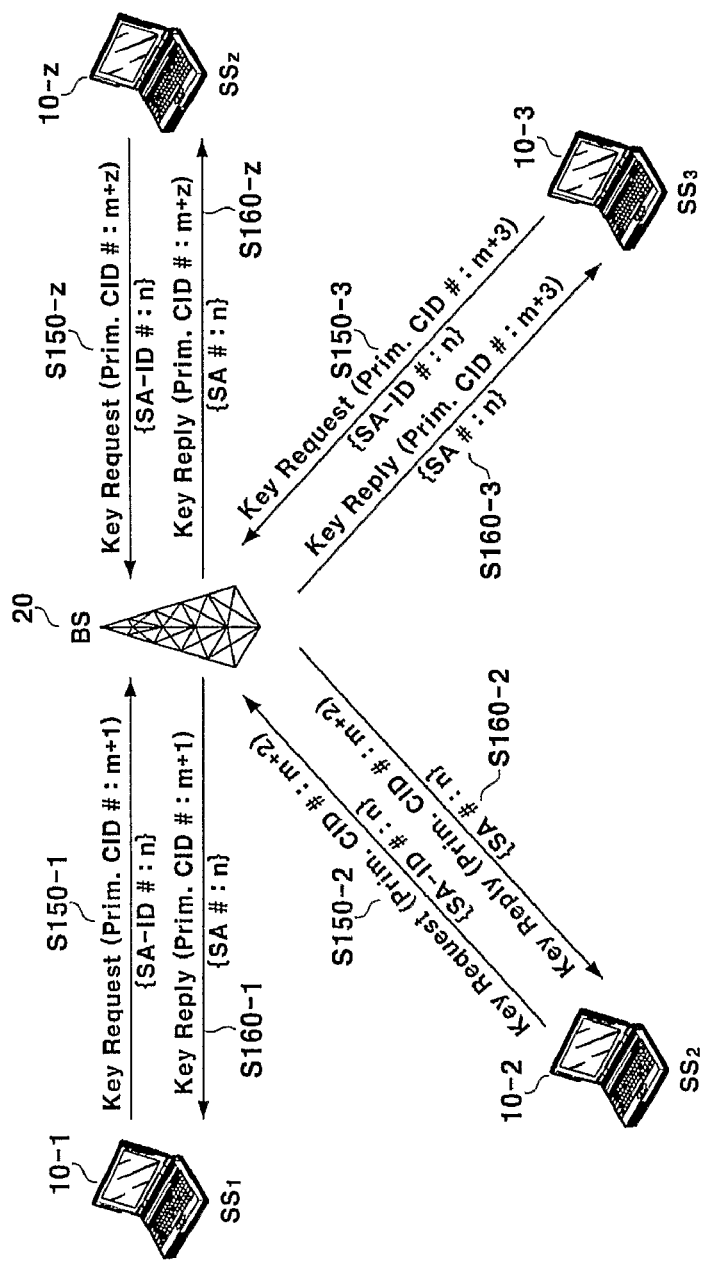
FIG. 6 shows a flowchart of a current method for updating a traffic encryption key between subscriber stations served with a multicast service or a broadcast service and a base station in a general wireless portable Internet system.

FIG. 6 shows a flowchart for updating a traffic encryption key between subscriber stations served with a multicast service and broadcast service and a base station in a general wireless portable Internet system.

The subscriber stations 10-1 to 10-z currently receive the same single multicast service or broadcast service from the base station 20 on the assumption that one of the multicast service and broadcast service relates to the $n^{th}$ SA.

When TEK Refresh Timeout events are respectively generated by the same TEK Grace Time stored in each subscriber stations 10-1 to 10-z having received the traffic encryption key, each subscriber stations 10-1 to 10-z simultaneously transmit a Key Request message to the base station 20 so as to receive a new traffic encryption key of the $n^{th}$ SA in steps S150-1 to S150-z.

The Key Request messages are transmitted to the base station 20 almost at once from the subscriber stations 10-1 to 10-z since the TEK Grace Times corresponding to the $n^{th}$ SA of the subscriber stations 10-1 to 10-z are the same. The above-noted Key Request messages include an SA-ID with the value of n, and the MAC headers of the Key Request messages use different Primary Management CIDs which are specifically allocated to the respective subscriber stations from the base station at the initial access of the subscriber stations.

26×z bytes are used for each service so that the z subscriber stations 10-1 to 10-z may simultaneously transmit a traffic encryption key update request message for the currently-serviced multicast service or broadcast service to the base station 20.

The base station 20 receives the traffic encryption key update request message of the $n^{th}$ SA from the respective z subscriber stations 10-1 to 10-z, updates the traffic encryption key of the $n^{th}$ SA, and concurrently transmits a Key Reply message including the $n^{th}$ SA to the subscriber stations 10-1 to 10-z in steps S160-1 to S160-z. The MAC header of the Key Reply message uses the Primary Management CID allocated to the z subscriber stations 10-1 to 10-z. 84×z bytes are used in the radio channel since the base station 20 must transmit the Key Reply message to the subscriber stations 10-1 to 10-z in order to distribute a traffic encryption key for a specific multicast service or broadcast service.

That is, the subscriber stations 10-1 to 10-z receive the same traffic encryption key from the base station and use the key to decrypt the corresponding service's traffic data, but it is insufficient that the subscriber stations respectively request a traffic encryption key update from the base station and the base station distributes an updated traffic encryption key to the respective subscriber stations for the purpose of updating the same traffic encryption key. For example, when z subscriber stations receiving a multicast service or a broadcast service are given, a total of 110×z bytes are needed to update the corresponding service's traffic encryption key, which wastes radio resources.

That is, if the method of updating the traffic encryption key for the multicast service or the broadcast service uses the same method of updating the traffic encryption key for the unicast service, then that method increases an undesired processing load of the base station 20 in addition to wasting the radio resources.

To solve the above-described problem, the base station automatically updates the traffic encryption key of the corresponding service and transmits the updated traffic encryption key to the subscriber station through a broadcast channel before the traffic encryption key for the multicast service or the broadcast service provided by the base station expires.

To achieve this purpose, a specific time is defined as shown in FIG. 7.

FIG. 7 shows a table for an operational range of encryption-related PKM parameters for updating the traffic encryption key in a wireless portable Internet system according to the first and the second exemplary embodiments of the present invention.

The PKM parameter table adds a multicast & broadcast (M&B) TEK Grace Time which is stored in the base station and represents a time at which the base station starts updating the traffic encryption key of the corresponding service before the traffic encryption key for the multicast service or the broadcast service expires. The M&B TEK Grace Time is established to be greater than the TEK Grace Time at which the subscriber station starts an update of a traffic encryption key before one expires, because the base station must update the traffic encryption key for the corresponding service and transmit the updated traffic encryption key to the subscriber station before the subscriber station transmits a Key Request message to the base station according to the operation of the TEK Grace Time.

Figure 8:
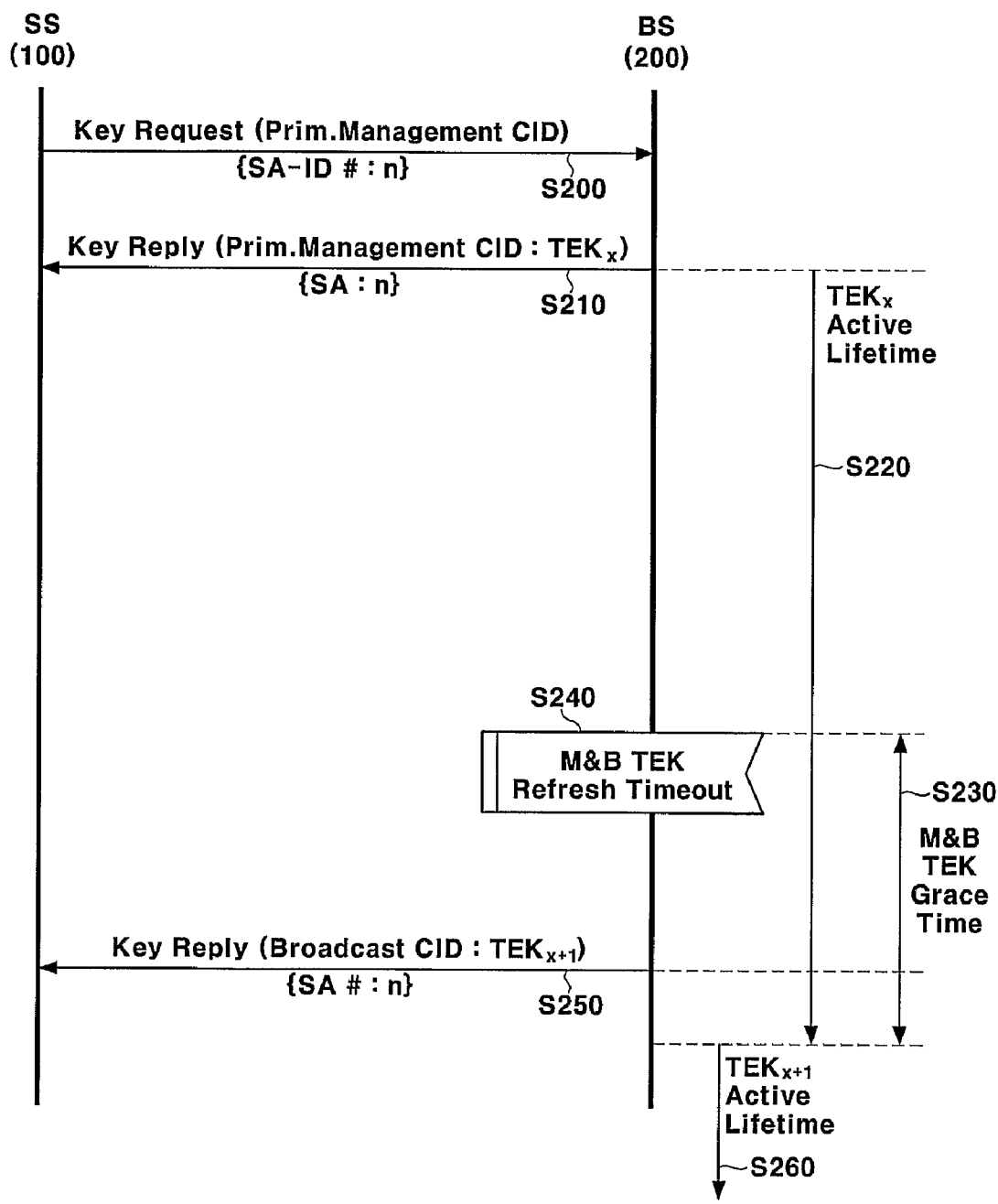
FIG. 8 shows a flowchart for managing a traffic encryption key in a wireless portable Internet system according to the first exemplary embodiment of the present invention.

FIG. 8 shows a flowchart for managing a traffic encryption key in a wireless portable Internet system according to the first exemplary embodiment of the present invention.

Referring to FIG. 8, the subscriber station must receive a traffic encryption key for decrypting the corresponding service's traffic data before receiving a multicast service or a broadcast service, which corresponds to the previous processes of S200 and S210 which correspond to the processes of S100 and S110 as shown in FIG. 7, and hence no descriptions thereof will be provided.

The $TEK_x$ Active Lifetime starts in step S220 when the subscriber station receives a Key Reply message including the traffic encryption key of the $x^{th}$ corresponding service for the $n^{th}$ SA from the base station. The subscriber station uses the $x^{th}$ traffic encryption key to decrypt the traffic data and receive the corresponding data during the $TEK_x$ Active Lifetime.

The base station must periodically update the traffic encryption key of the $n^{th}$ SA so as to provide seamless and stable traffic data of the corresponding service to the subscriber station, differing from the case of FIG. 5 in which the subscriber station requests the traffic encryption key's update according to the TEK Grace Time in the general wireless portable Internet system.

To execute this operation, the base station manages the parameter of the M&B TEK Grace Time as described with reference to FIG. 7. The base station uses a traffic encryption key state machine (realized as software in the base station) to generate an M&B TEK Refresh Timeout event in step S240 and updates the traffic encryption key to be the $(x+1)^{th}$ traffic encryption key $TEK_{x+1}$ when the M&B TEK Grace Time starts for the multicast service or the broadcast service in step S230.

The base station transmits a Key Reply message including the $(X+1)^{th}$ updated traffic encryption key with respect to the $n^{th}$ SA to the subscriber station in step S250.

When the subscriber station receives the Key Reply message, the TEK Grace Time managed by the subscriber station does not act. Accordingly, when receiving the multicast service or the broadcast service, the subscriber station receives a traffic encryption key without requesting a new traffic encryption key for the corresponding service, differing from the case of traffic encryption key update procedure for the unicast service.

The $TEK_{x+1}$ Active Lifetime starts in step S260, and the base station and the subscriber station encrypt and decrypt the corresponding service data by using the $(x+1)^{th}$ traffic encryption key $TEK_{x+1}$.

A broadcast CID is used in the MAC header of the Key Reply message so that the base station efficiently distributes the updated traffic encryption key loaded on the single Key Reply message to the subscriber stations served with the multicast service and the broadcast service through a broadcast connection. The subscriber station uses the SA-ID included in the Key Reply message to identify which traffic encryption key is used, and the traffic encryption key is used to encrypt the multicast service data or broadcast service data. For example, the $(x+1)^{th}$ traffic encryption key $TEK_{x+1}$ in the Key Reply message provided by the base station in FIG. 8 is the $n^{th}$ SA used to encrypt the service related to the SA, and the subscriber stations using the SA-related service receive the $(x+1)^{th}$ traffic encryption key $TEK_{x+1}$ and use the same.

The Key Reply message used when the base station updates the traffic encryption key for the multicast service or the broadcast service has 55 bytes at a maximum.

Figure 9:
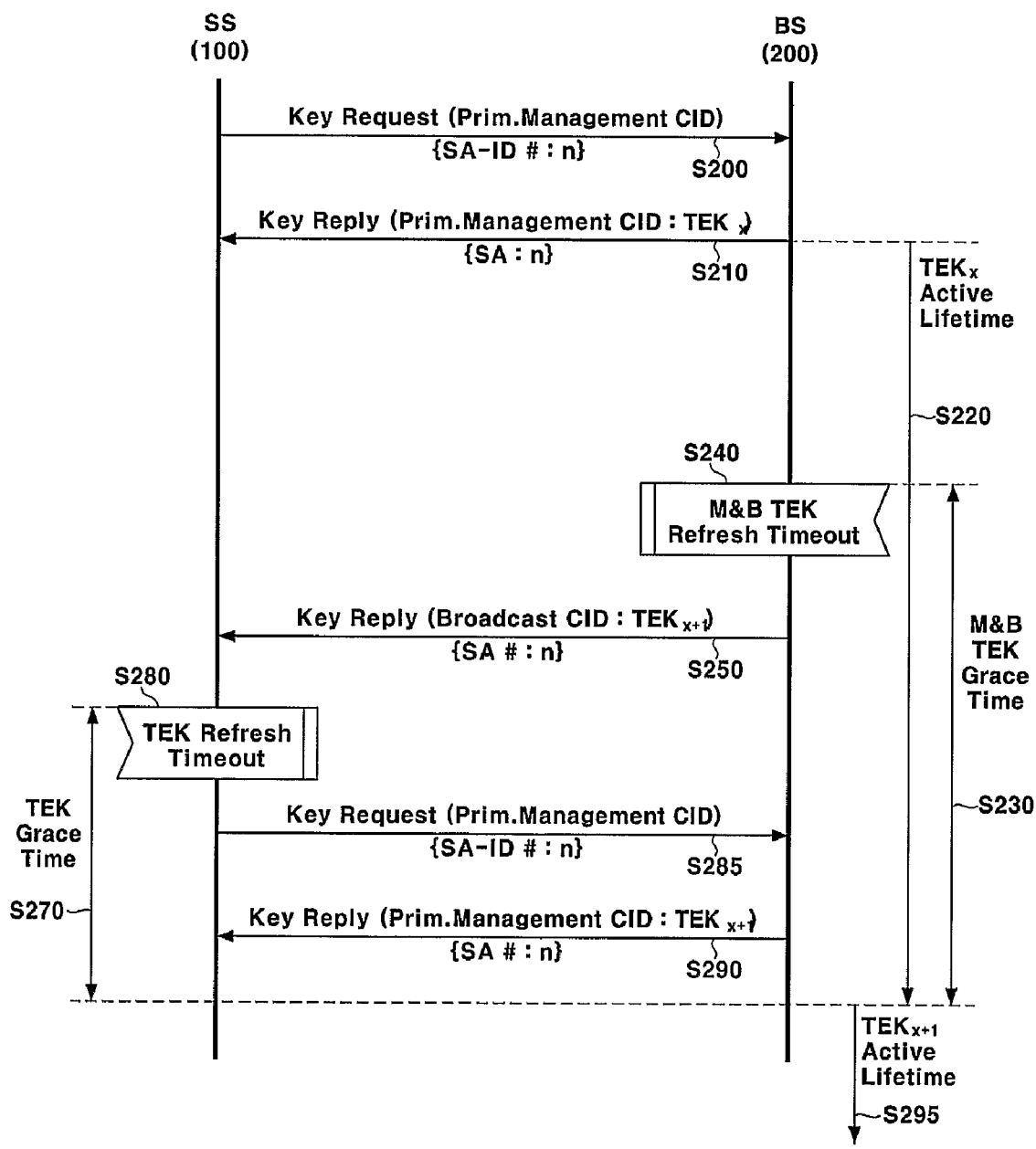
FIG. 9 shows a method for managing a traffic encryption key when a subscriber station fails to receive a Key Reply message including a new traffic encryption key transmitted by a base station through a broadcast connection.

FIG. 9 shows a flowchart for managing a traffic encryption key when a subscriber station fails to receive a Key Reply message including a new traffic encryption key transmitted by a base station through a broadcast connection.

The subscriber station initially requests a traffic encryption key for a multicast service or a broadcast service from the base station and receives one in steps S200 and S210, an M&B TEK Grace Time starts on the side of the base station so that the base station automatically produces the traffic encryption key and transmits one to the subscriber stations through a broadcast connection in steps S220 to S250, and the subscriber stations accordingly receive the traffic encryption key updated by the base station, but when subscriber stations fail to receive the traffic encryption key (i.e., the message) from the base station, the such subscriber stations individually request an update of the traffic encryption key from the base station to thus receive one as described with reference to FIG. 1. That is, when the subscriber stations fail to receive the traffic encryption key from the base station, the TEK Grace Time managed by the subscriber stations is operated in step S270 to generate a TEK Refresh Timeout event to the traffic encryption key state machine in step S280, and the subscriber stations request a next-period traffic encryption key from the base station in step S285. Therefore, the subscriber station transmits the Key Request message and receives the Key Reply message to/from the base station through the primary management connection to thus update the traffic encryption key in steps S285 and S290 in a like manner of the initial distribution process of the traffic encryption key, and the $TEK_{x+1}$ Active Lifetime starts in step S295 when the $TEK_x$ Active Lifetime expires. The subscriber station decrypts the subsequent service data according to the $(x+1)^{th}$ traffic encryption key $TEK_{x+1}$.

Figure 10:
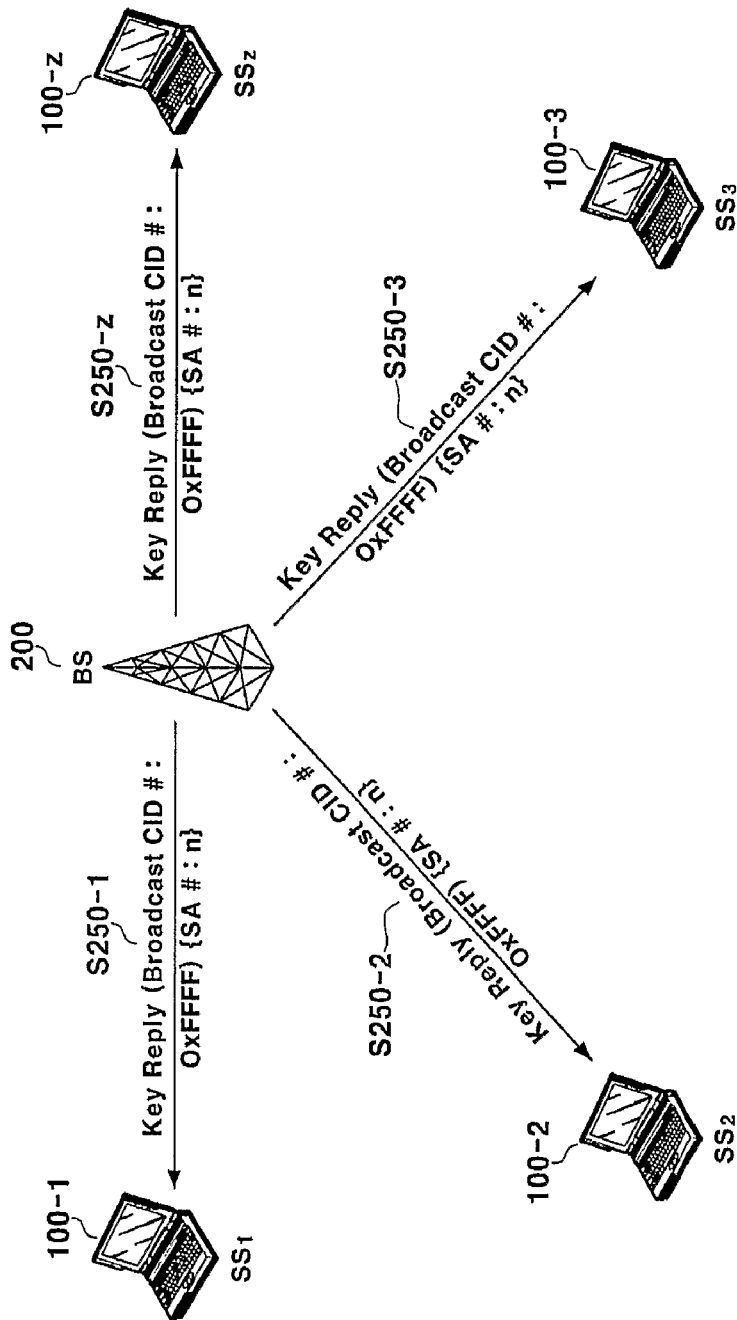
FIG. 10 shows a flowchart of a method for updating a traffic encryption key between subscriber stations served with a multicast service or a broadcast service and a base station in a wireless portable Internet system according to the first exemplary embodiment of the present invention.

FIG. 10 shows a flowchart for updating a traffic encryption key between subscriber stations served with the multicast service and the broadcast service and a base station in a wireless portable Internet system according to the first exemplary embodiment of the present invention.

The subscriber stations 100-1 to 100-z currently receive the same single multicast service or broadcast service on the assumption that the multicast service or broadcast service relates to the $n^{th}$ SA.

The base station 200 manages the M&B TEK Refresh Timeout as described with reference to FIG. 7 in order to update the traffic encryption key for the multicast service or broadcast service.

When an M&B TEK Refresh Timeout event is generated at the time of M&B Grace Time, the base station 200 automatically updates the traffic encryption key for the corresponding service, loads the updated traffic encryption key to a Key Reply message, and transmits one to the subscriber stations 100-1 to 100-z through a broadcast connection to thereby distribute the traffic encryption key to the subscriber stations in steps S250-1 to S250-z. In this instance, a broadcast CID to be transmittable once to the subscriber stations 100-1 to 100-z is used in the MAC header of the Key Reply message.

Accordingly, the base station 200 uses 55 bytes of radio resources for the purpose of updating the traffic encryption key and distributing one to the subscriber stations, compared to the conventional case in which the z subscriber stations require 110×z bytes of radio resources, which shows the efficiency of the exemplary embodiment of the present invention. Further, the base station and the subscriber stations 100-1 to 100-z have needed a large amount of processing signal resources for a key update (e.g., to process an MAC message and a corresponding SA) in the prior art, but the base station advantageously and stably updates and distributes a traffic encryption key to the subscriber stations which receive the corresponding service with a lesser amount of processing signal resources in the exemplary embodiment of the present invention.

FIG. 11 shows a table for relationship between CIDs of a MAC header and corresponding input keys for encrypting a traffic encryption key when the traffic encryption key is distributed according to a traffic encryption key management method in the wireless portable Internet system according to the first exemplary embodiment of the present invention.

The process for the subscriber station 100 to receive a traffic encryption key includes: a) the subscriber station 100 requesting generation of a new traffic encryption key for a corresponding service from the base station in order to receive a multicast service or a broadcast service, and b) the base station 200 updating a corresponding traffic encryption key and distributing the updated traffic encryption key to the subscriber stations 100-1 to 100-z receiving the corresponding service. In this instance, the traffic encryption key distributed by the base station 200 is encrypted by using the 3-data encryption standard (3-DES) method or the advanced encryption standard (AES) method, and the encrypted traffic encryption key is transmitted to the subscriber station 100.

The subscriber station 100 receives the encrypted traffic encryption key, uses two pre-shared input keys to decrypt the traffic encryption key, and thus has the decrypted traffic encryption key. Different input keys for encrypting the traffic encryption key are used depending on the traffic encryption key update process requested by the subscriber station 100 or the traffic encryption key update process executed by the base station 200 in order to maintain the security of the traffic encryption key.

When the subscriber station 100 requests a generation of a new traffic encryption key of the corresponding service from the base station, the subscriber station 100 transmits a Key Request message to the base station 200, and the base station 200 transmits a Key Reply message including the updated traffic encryption key to the subscriber station. A primary management CID is used for the CID value of the MAC header since the base station 200 and the single subscriber station 100 communicate with each other through the Key Request message and the Key Reply message. That is, the traffic encryption key received through a primary management connection which is a dedicated channel for the subscriber station 100 is encrypted by a private key shared by the corresponding subscriber station 100 and the base station 200. A Key Encryption Key (KEK) derived from an Authorization Key (AK) of the corresponding subscriber station 100 is used for the private key. Hence, the 128-bit KEK is used as an input key for encrypting the traffic encryption key (distributed by using the primary management CID) into a 3-DES or AES based algorithm.

When the base station automatically updates the traffic encryption key and distributes one to the subscriber stations by using a Key Reply message, a broadcast CID is used for a CID value of the MAC header since the base station 200 must transmit the Key Reply message to the subscriber stations receiving the corresponding service. However, the traffic encryption key cannot be encrypted with the individual private keys shared by the base station 200 and the subscriber stations since the base station transmits the traffic encryption key of the corresponding service through the broadcast connection. Therefore, a secure common key to be shared by the base station and the currently-serviced subscriber stations, specifically to the multicast service or the broadcast service, is required so as to encrypt the traffic encryption key and distribute the same. An old distributed traffic encryption key used for encrypting the corresponding service traffic data belongs to the above-featured secure common key. The 64-bit old distributed traffic encryption key for the multicast service or the broadcast service is used to be an input key for encrypting the traffic encryption key which shall be newly distributed with the broadcast CID into the 3-DES or AES based algorithm. The two input keys are used in the 3-DES method, and in this instance, an old distributed traffic encryption key is used for the two input keys. The AES method requires a 128-bit input key, and so, a 128 bit key generated by concatenating two 64-bit old traffic encryption keys is used for the 128-bit input key.

Therefore, the base station 200 derives a KEK from AK to encrypt the traffic encryption key and transmits the encrypted traffic encryption key to the subscriber station 100 by using a primary management CID in the case of updating the traffic encryption key according to a request by the subscriber station 100, and the base station 200 uses a traffic encryption key previously generated for the corresponding service to encrypt the new traffic encryption key, and uses a broadcast CID to transmit the traffic encryption key to the subscriber stations 100-1 to 100-z. Also, the subscriber station 100 uses the KEK to decrypt the traffic encryption key when receiving the traffic encryption key through the Key Reply message based on the primary management CID, and the subscriber station 100 uses the old distributed TEK to decrypt the traffic encryption key when receiving the traffic encryption key through the Key Reply message based on the broadcast CID. Accordingly, the system can maintain the security of the traffic encryption key and, the subscriber station receives an automatically updated traffic encryption key from the base station, thereby allowing efficient management of the system.

A method for managing a traffic encryption key in a wireless portable Internet system according to the second exemplary embodiment of the present invention will be described.

Figure 12:
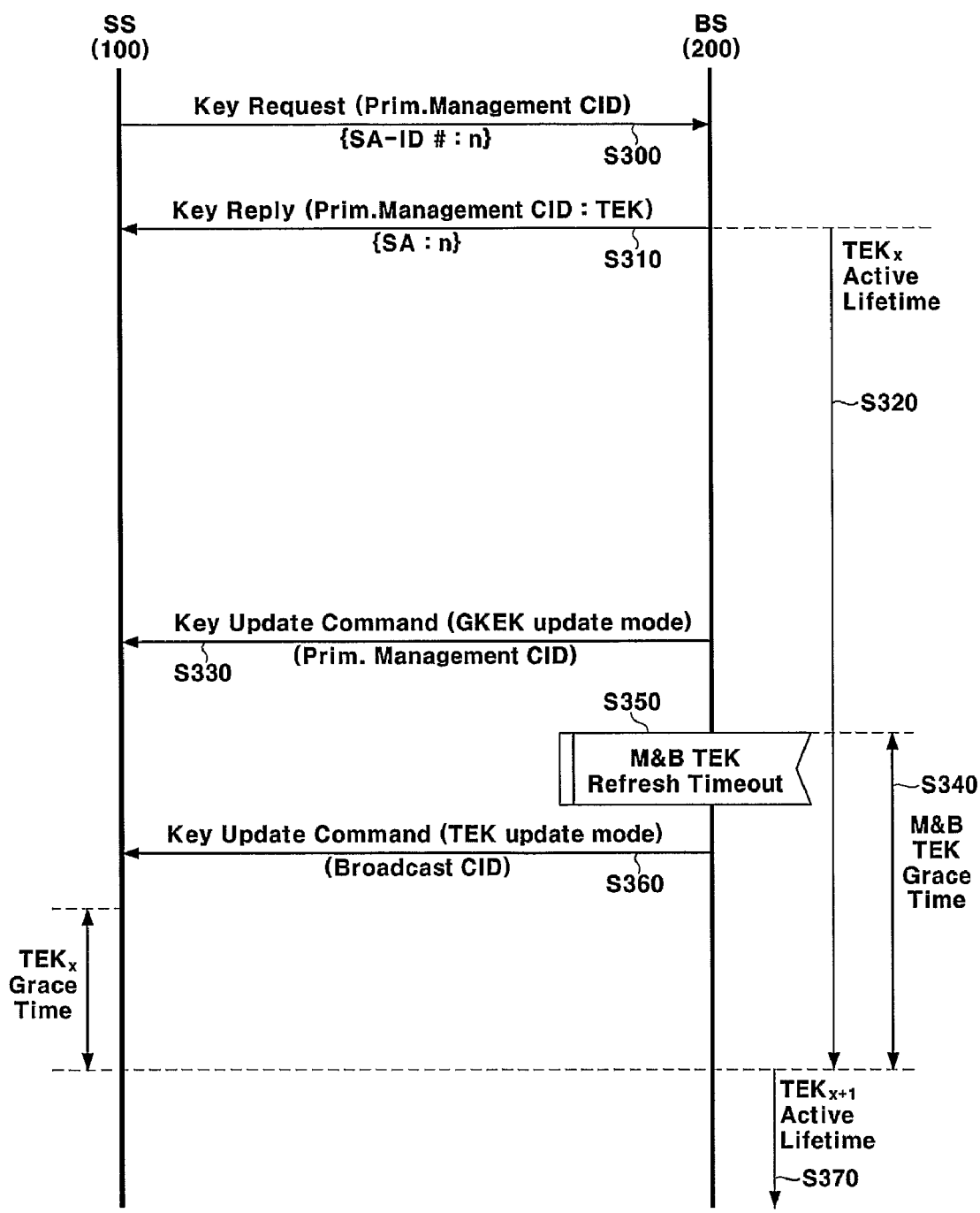
FIG. 12 shows a flowchart for managing a traffic encryption key in a wireless portable Internet system according to the second exemplary embodiment of the present invention.

FIG. 12 shows a flowchart for managing a traffic encryption key in a wireless portable Internet system according to the second exemplary embodiment of the present invention.

Referring to FIG. 12, the subscriber station 100 receives a traffic encryption key needed for decrypting traffic data of a multicast service or a broadcast service from the base station 200 before receiving the corresponding service in steps S300 and S310, which correspond to the steps of S100 and S110 shown in FIG. 5. In addition, the Key Reply message includes a Group Key Encryption Key (GKEK) which is encrypted by a pre-shared Authorization Key of the subscriber station 100 and is a parameter defined for the multicast service or the broadcast service.

The $TEK_x$ Active Lifetime of the subscriber station 100 starts in step S320 when the subscriber station 100 receives a Key Reply message including the $x^{th}$ traffic encryption key of the corresponding service with respect to the $n^{th}$ SA from the base station 200, and the subscriber station 100 uses the $x^{th}$ traffic encryption key to decrypt the traffic data and receive the corresponding service during the $TEK_x$ Active Lifetime.

It is needed to periodically update the traffic encryption key of the $n^{th}$ SA so that the base station may stably provide seamless traffic data of the corresponding service to the subscriber station.

Similar to the first embodiment described with reference to FIG. 5 to FIG. 8, the subscriber station 100 does not generate an update of a traffic encryption key according to the TEK Grace Time, but the base station 200 periodically updates the corresponding service's traffic encryption key in the second embodiment. In the second embodiment, the base station 200 updates the traffic encryption key by using two types of Key Update Command messages one of which is transmitted before the M&B TEK Grace Time starts and another of which is transmitted after the M&B TEK Grace Time starts, instead of automatically updating the traffic encryption key executed by the base station 200 when the M&B TEK Grace Time starts as shown in FIG. 8. The base station 200 manages the M&B TEK Grace Time in a like manner of the first embodiment shown in FIG. 7.

The base station 200 respectively transmits the first Key Update Command message including a 20-byte GKEK to the subscriber stations 100-1 to 100-z at different intervals (so that the distribution of GKEKs may not be concentrated at a specific time frame) in step S330 before the M&B TEK Grace Time starts for the multicast service or the broadcast service.

In this instance, a primary management CID for identifying the subscriber station is used in the MAC header of the Key Update Command message, and the GKEK is encrypted by a shared AK between the corresponding subscriber station and the base station. The base station 200 generates an M&B TEK Refresh Timeout event in step S350 to update the traffic encryption key to be the $(x+1)^{th}$ traffic encryption key through a traffic encryption key state machine (realized in the base station 200 in the software format) when the M&B TEK Grace Time starts for the multicast service or the broadcast service in step S340.

Therefore, the base station 200 newly updates the traffic encryption key for the multicast service or the broadcast service through the traffic encryption key state machine according to the M&B TEK Refresh Timeout event, and the updated traffic encryption key in this instance is the $(x+1)^{th}$ traffic encryption key.

The base station 200 broadcasts then a second Key Update Command message (using a broadcast CID in the MAC header of the message) including the $(x+1)^{th}$ traffic encryption key (encrypted with an distributed GKEK through the first Key Update Command message) updated with respect to the $n^{th}$ SA to the subscriber stations 100-1 to 100-z through a broadcast connection in step S360.

When the subscriber station 100 receives the two Key Update Command messages including the GKEK and the traffic encryption key, the TEK Grace Time managed by the subscriber station 100 is not operated.

When the TEK$_x$ Active Lifetime expires, the TEK$_{x+1}$ Active Lifetime starts in step S370, and the subscriber station uses the $(x+1)^{th}$ traffic encryption key to decrypt the corresponding service data when the TEK$_x$ Active Lifetime expires.

The two different Key Update Command messages are used to update the traffic encryption key for the multicast service or the broadcast service in the second embodiment. In the first case, the Key Update Command message is used to distribute the GKEK. That is, the base station 200 transmits each Key Update Command message (50 bytes maximum) to the subscriber stations 100-1 to 100-z receiving the corresponding service through a primary management connection before the M&B Grace Time. The base station 200 includes then a traffic encryption key to be active for a subsequent active lifetime into the Key Update Command message and broadcasts the same to the subscriber stations 100-1 to 100-z through the broadcast connection when it comes to the M&B TEK Grace Time managed by the base station. In this instance, the Key Update Command message including the traffic encryption key has 50 bytes at a maximum.

Figure 13:
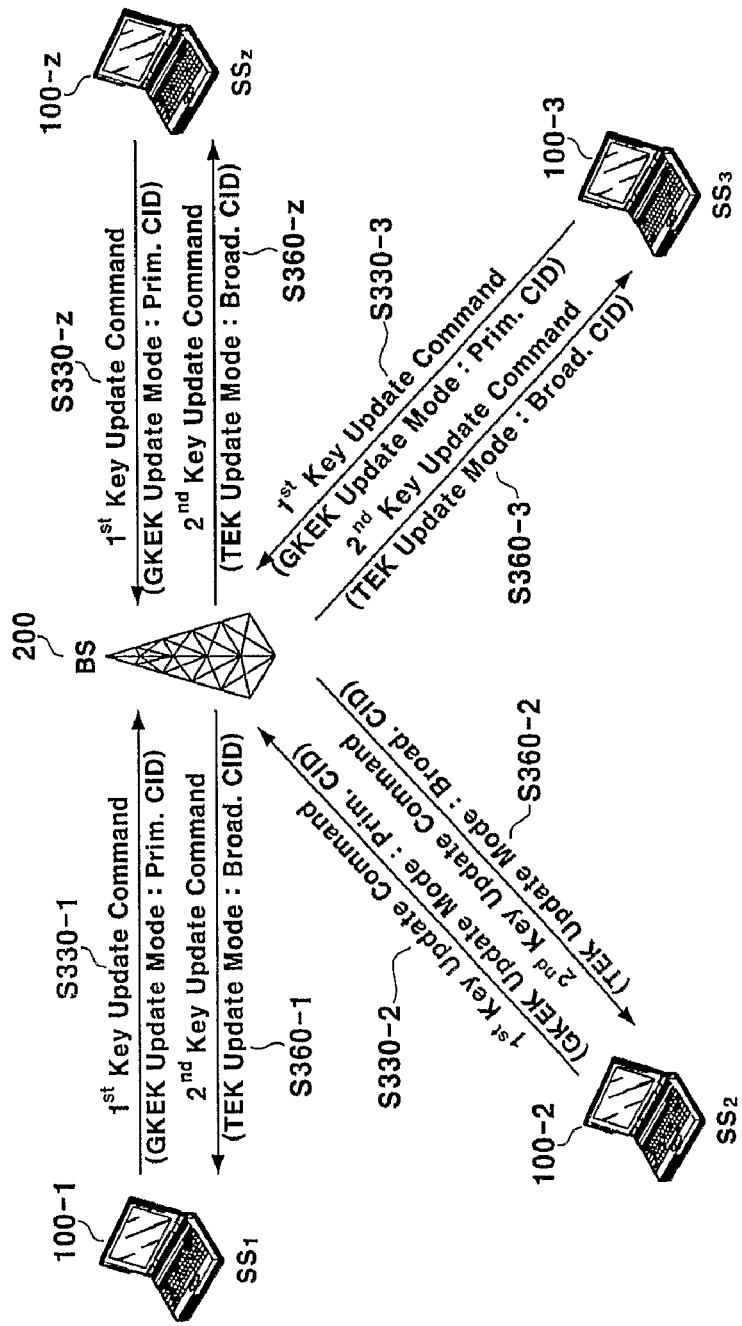
FIG. 13 shows a flowchart of a method for updating a traffic encryption key between subscriber stations served with a multicast service or a broadcast service and a base station in a wireless portable Internet system according to the second exemplary embodiment of the present invention.

FIG. 13 shows a flowchart for updating a traffic encryption key between subscriber stations served with the specific multicast service or the broadcast service and a base station in a wireless portable Internet system according to the second exemplary embodiment of the present invention. The subscriber stations 100-1 to 100-z receive the same single multicast service or broadcast service which is assumed to be related to the n$^{th}$ SA.

The base station 200 manages the M&B TEK Grace Time as shown in FIG. 7 so as to update the traffic encryption key for the multicast service or the broadcast service. Before the M&B TEK Grace Time starts, the base station 200 respectively transmits the first Key Update Command message to the subscriber stations through the primary management connection to thus distribute a GKEK for encrypting the subsequent traffic encryption key to the subscriber stations in steps S330-1 to S330-z. In this instance, the base station 200 separately transmits the first Key Update Command message to each subscriber station for a predetermined time frame so that an overload may not occur in the base station 200, and a primary management CID is used in the MAC header of the Key Update Command message.

When the M&B TEK Grace Time starts, an M&B TEK Refresh Timeout event occurs in the base station 200, and the base station automatically updates a traffic encryption key for a corresponding service, includes the traffic encryption key into the second Key Update Command message, and transmits that message to the subscriber stations 100-1 to 100-z through the broadcast connection to thus simultaneously distribute the traffic encryption key in steps S360-1 to S360-z. In this instance, the traffic encryption key can be transmitted to the subscriber station from the base station through one Key Update Command message, and a broadcast CID to be transmitted once to the subscriber stations 100-1 to 100-z will be used in the MAC header of the Key Update Command message.

Therefore, the base station 200 uses a (50×z)-byte first Key Update Command message and a 50-byte second Key Update Command message thus totally using (50×z+50) bytes of radio resources in the second embodiment, but z subscriber stations use (110×z) bytes of radio resources in the prior art, which shows that the method provided by the second embodiment becomes more efficient as the subscriber stations receiving the multicast service or the broadcast service are increased. Also, the base station 200 needs a large amount of data processing at once so as to generate an MAC message and a corresponding SA in the conventional method in which the subscriber stations start the update of traffic encryption key, but the base station can stably update and distribute the traffic encryption key to the currently-serviced subscriber stations with a lesser amount of data processing through diversification of loads in the second embodiment.

FIG. 14 shows a table for parameters of a Key Reply message used for managing a traffic encryption key in a wireless portable Internet system according to the second exemplary embodiment of the present invention.

When the subscriber station 100 requests an initial traffic encryption key from the base station 200 in step S300 of FIG. 12, the base station transmits a Key Reply message to the subscriber station 100 in step S310 of FIG. 12. In this instance, the Key Reply message includes a Key-Sequence-Number representing an authorization key sequence number related to the traffic encryption key; an SA-ID indicating an identifier of the corresponding SA; TEK-Parameters relevant to traffic encryption keys each of which is active during a current traffic encryption key active lifetime and a subsequent traffic encryption key active lifetime; and an HMAC-Digest for authenticating the Key Reply message.

FIG. 15 shows a table for TEK parameters shown in FIG. 14.

Referring to FIG. 15, the TEK parameters include a GKEK which is defined for the multicast service or the broadcast service, is randomly generated to be used for encrypting the traffic encryption key, and is encrypted into an Authorization Key.

In addition, the TEK parameters include a traffic encryption key (TEK) used for encrypting traffic data. The base station 200 uses the GKEK to encrypt the traffic encryption key so as to transmit the traffic encryption key to the currently-serviced subscriber stations, but the base station uses the TEK to encrypt the traffic encryption key for the unicast service or the first embodiment.

Further, the TEK parameters include a Key-Lifetime, a Key-Sequence-Number, and a cipher block chaining initialization vector (CBC-IV) functioning as an input key for encrypting traffic data.

In particular, the subscriber stations 100-1 to 100-z receiving one of the multicast service and the broadcast service share the same GKEK and traffic encryption key, differing from the unicast service. As to generation of the GKEK and the traffic encryption key, the base station generates the GKEK and the traffic encryption key when a service area covers a single base station, and the authentication authorization and accounting (AAA) server generates them when the service area covers a network. Also, the sequence number and the active lifetime of the GKEK correspond to those of the traffic encryption key.

FIG. 16 shows a table for parameters of the Key Update Command message used for managing the traffic encryption key in the wireless portable Internet system according to the second exemplary embodiment of the present invention.

As shown, the Key Update Command message defined for the multicast service and the broadcast service includes: a Key-Sequence-Number representing an Authorization Key sequence number relevant to the traffic encryption key to be distributed through the Key Update Command message; an SA-ID indicating an identifier of the corresponding SA; Key Push Modes for identifying the two Key Update Commands given in FIG. 12; a Key Push Counter for preventing replay attacks when an HMAC-Digest is used to authenticate the Key Update Command message (the Key Push Counter is a parameter managed by the base station for the corresponding multicast service or the broadcast service, and is a 2-byte parameter increased by one each time the Key Update Command message is transmitted); TEK-parameters defined in FIG. 15; and an HMAC-Digest.

In particular, parameters included in the first Key Update Command message transmitted to the subscriber stations for the purpose of updating the GKEK are different from parameters included in the second Key Update Command message concurrently transmitted to the subscriber stations through the broadcast connection for the purpose of updating the traffic encryption key.

That is, the first and second Key Update Command messages have the Key-Sequence-number for the Authorization Key, the SA-ID, the Key Push modes, the Key Push Counter, and the HMAC-Digest except the TEK-Parameters, but the first Key Update Command message has the GKEK and the Key-Sequence-number for the traffic encryption key from among the TEK-Parameters, and the second Key Update Command message has the TEK, the Key-Lifetime, the Key-Sequence-Number for the traffic encryption key, and the CBC-IV.

FIG. 17 shows a table for the Key Push Modes parameter shown in FIG. 16.

The Key Push Modes parameter identifies usage of the Key Update Command message. The base station 200 transmits two Key Update Command messages to the subscriber station 100 when updating the traffic encryption key for the multicast service or the broadcast service. The first Key Update Command message is used to update the GKEK, and the second Key Update Command message is used to update the traffic encryption key and distribute them to the subscriber station 100. Hence, the usage of the Key Update Command message depends on the Key Push Modes, and in detail, the Key Push Modes of 0 represents the usage of the first Key Update Command for updating the GKEK, and the Key Push Modes of 1 represents the usage of the second Key Update Command for updating the traffic encryption key. Accordingly, the subscriber station 100 determines the usage through the Key Push Modes.

FIG. 18 shows a table for input keys used for generating the HMAC-Digest parameter shown in FIG. 16. The HMAC-Digest is used to authenticate the Key Update Command message, and the input keys for generating HMAC authentication keys of the downlink Key Update Command message are varied according to usage of the Key Update Command message, that is, according to the Key Push Modes.

The input key for generating an HMAC authentication key is an Authorization Key (AK) previously distributed to the corresponding subscriber station when the first Key Update Command message (i.e., the Key Push Modes) respectively transmitted to the subscriber stations receiving the multicast service or the broadcast service is in the GKEK update mode, and the input key for generating an HMAC authentication key is a GKEK distributed through the first Key Update Command message of the GKEK update mode when the second Key Update Command message (i.e., the Key Push Modes) concurrently transmitted to the subscriber stations receiving the multicast service or the broadcast service is in the TEK update mode. The subscriber stations receiving the corresponding service are to authenticate the Key Update Command message of the TEK update mode since the Key Update Command message is broadcast since the base station and the currently-serviced subscriber stations share the GKEK in a secure manner.

Also, the Key Push Counter, used as another input key for the HMAC authentication key, increases the count by 1 for each Key Update Command message to thereby prevent the reply attacks on the Key Update Command message.

A method for generating a downlink HMAC authentication key for authenticating the respective Key Update Command messages will now be exemplified.

HMAC_KEY_D=SHA(H_PAD_D|KeyIN|Key Push Counter)

with H_PAD_D=0×3A repeated 64 times.

The downlink HMAC authentication key is generated using the Secure Hash Algorithm (SHA) which is defined by the Secure Hash Standard (SHS) by US NIST. As expressed above, the H_PAD_D having the value of 0×3A repeated 64 times, the KeyIN, and the Key Push Counter are connected to each other and are provided to thus generate the downlink HMAC authentication key. In this instance, the KeyIN is an Authorization Key of the subscriber station in the case of the first Key Update Command message, and is a GKEK managed per the multicast service or the broadcast service in the case of the second Key Update Command message.

A case in which the subscriber station 100 fails to correctly receive at least one of the two Key Update Command messages from the base station when the base station automatically updates the traffic encryption key and distributes one to the subscriber station through the Key Update Command messages as shown in FIG. 12 will now be described with reference to FIG. 19.

Figure 19:
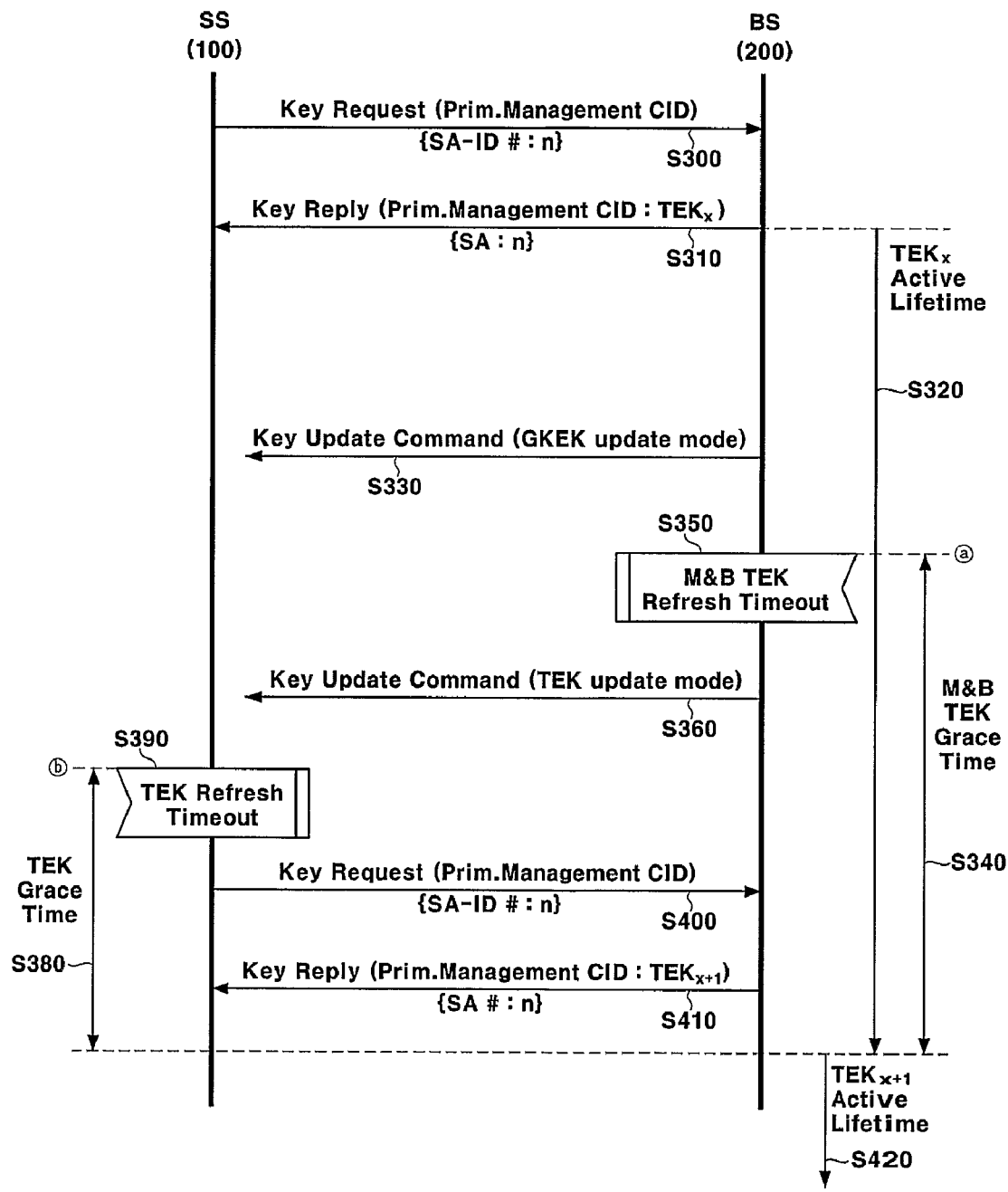
FIG. 19 shows a flowchart of a method for managing a traffic encryption key when a base station transmits two different Key Update Command messages to a subscriber station and the subscriber station fails to correctly receive one of two messages from the base station.

Referring to FIG. 19, the process described by steps S300 to S360 corresponds to that described with reference to FIG. 12.

When the subscriber station 100 fails to normally receive at least one of the two Key Update Command messages from the base station 200, that is, when the subscriber station 100 fails to receive a traffic encryption key, the corresponding subscriber station 100 individually requests an update of the traffic encryption key from the base station 200 as described with reference to FIG. 1. In detail, when the subscriber station 100 fails to receive a traffic encryption key, the TEK Grace Time managed by the subscriber station 100 is operated in step S380, a TEK Refresh Timeout event is generated in the traffic encryption key state machine in the subscriber station 100 in step S390, and the subscriber station 100 requests a traffic encryption key of a next period from the base station in step S400. Accordingly, the subscriber station 100 transmits the Key Request message and receives a Key Reply message to/from the base station through the primary management connection in a like manner of the initial traffic encryption key distribution process, thereby finishing the update of traffic encryption key in steps S400 and S410. The $TEK_{x+1}$ Active Lifetime starts in step S420 when the $TEK_x$ Active Lifetime expires. The subscriber station decrypts the corresponding service data provided after the $TEK_{x+1}$ Active Lifetime starts by using the $(x+1)^{th}$ traffic encryption key.

FIG. 20 shows a table for information on TEK parameters included in the Key Reply message transmitted by a base station in response to a request of a traffic encryption key by a subscriber station, in an abnormal case shown in FIG. 19.

Referring to FIG. 19, the subscriber station 100 can transmit the Key Request message to the base station 200 at various times.

The subscriber station 100 is allowed to request a traffic encryption key from the base station through a Key Request message at any time so as to receive a multicast service or a broadcast service, and the base station differently configures internal parameters of the Key Reply message with reference to the M&B TEK Grace Time.

For example, when initially receiving the Key Request message (i.e., an initial TEK response) from the subscriber station 100 before the M&B TEK Grace Time of ⓐ starts, the base station 200 transmits a Key Reply message including TEK Parameters which are active during the current period of the corresponding service to the subscriber station 100.

Differing from this, when initially receiving the Key Request message from the subscriber station 100 after the M&B TEK Grace Time of ⓐ starts, the base station 200 transmits a Key Reply message including TEK Parameters$_C$ (being active during the current period) and TEK Parameters$_N$ (being active during the next period) thereto, in which the base station 200 advantageously provides no TEK Parameters$_N$ to the subscriber stations 100-1 to 100-z before the time of ⓐ at which the TEK$_{x+1}$ is provided to the subscriber stations 100-1 to 100-z, and the size of the Key Reply message which is a traffic encryption key response message is also reduced.

The base station 200 also transmits the TEK Parameters$_C$ and the TEK Parameters$_N$ to the subscriber stations having requested the traffic encryption key after the time of ⓐ so that the subscriber station may not request traffic encryption key, being active during a subsequent period after the TEK Grace Time of ⓑ managed by the subscriber station 100.

In addition, when the subscriber station 100 requests a new traffic encryption key (i.e., a TEK Update response) from the base station after the TEK Grace Time of ⓑ, the base station 200 transmits a Key Reply message including TEK Parameters$_N$ to the subscriber station 100 on the assumption that the subscriber station has the TEK Parameters$_C$ since the subscriber station currently receives a corresponding service. Accordingly, undesired information is reduced when the base station transmits the Key Reply message to the subscriber station.

Figure 21:
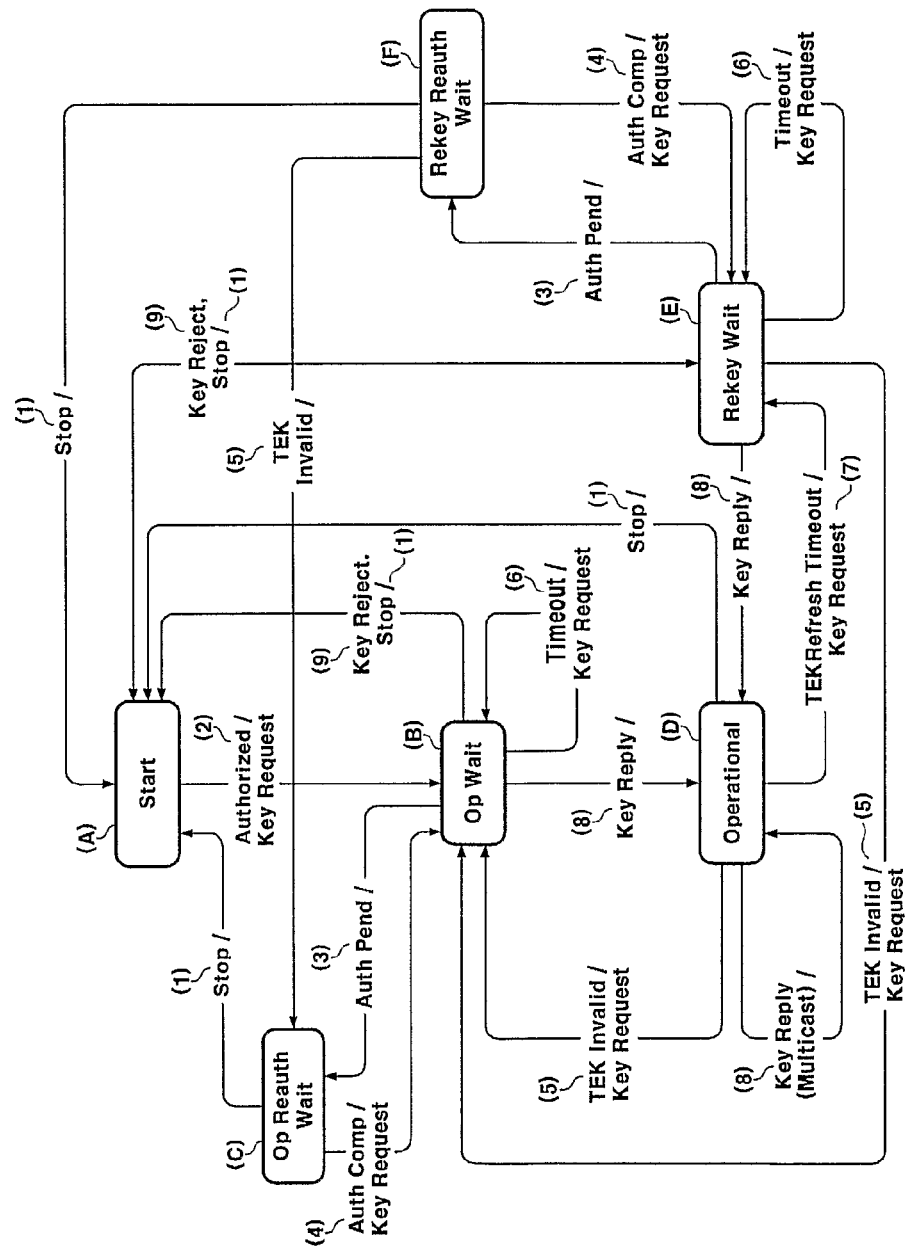
FIG. 21 shows a state transition diagram of a traffic encryption key state machine in a method for managing a traffic encryption key in a wireless portable Internet system according to the first exemplary embodiment of the present invention.

FIG. 21 shows a state transition diagram of a traffic encryption key state machine in a method for managing a traffic encryption key in a wireless portable Internet system according to the first exemplary embodiment of the present invention, and FIG. 22 shows a table for the state transition shown in FIG. 21.

The subscriber station 100 and the base station 200 follow the traffic encryption key state machine transition diagram in the case of the unicast service, the multicast service, and the broadcast service, and include two maximum traffic encryption key state machines for each of the multicast service and the broadcast service. An operation of the traffic encryption key state machine will now be described with reference to the subscriber station 100, and the operation can also be referred to by the base station 200 according to generation of events.

When the subscriber station 100 is normally driven to be ready for radio communication with the base station 200, the traffic encryption key state machine enters the Start state of (A).

When the subscriber station 100 receives an Authorized event of (2), the subscriber station 100 desires to receive a multicast service or a broadcast service and transmits a Key Request message to the base station 200 to request a traffic encryption key on the corresponding service, and the traffic encryption key state machine goes to the Op Wait state of (B).

When the subscriber station 100 receives a traffic encryption key from the base station 200 through a Key Reply message (8), the traffic encryption key state machine goes to the Operational state of (D) in which the subscriber station 100 shares the traffic encryption key with the base station 200 and is allowed to communicate data therewith.

However, when the subscriber station receives a Key Reject message from the base station (9) in the Op Wait state of (B), the traffic encryption key state machine goes to the Start state of (A).

When the subscriber station 100 receives a traffic encryption key updated at the M&B TEK Grace Time from the base station through a Key Reply message (8) while the traffic encryption key state machine normally receives the traffic encryption key and stands by in the Operational state of (D), the traffic encryption key state machine stores an updated SA in an authentication and security database in the Operation state of (D) in which the traffic encryption key state machine has the existing active traffic encryption key, and again goes to the Operational state of (D).

However, when failing to normally receive the Key Reply message from the base station 200 in the Operational state as shown in FIG. 9, the subscriber station 100 generates a TEK Refresh Timeout event of (7) to the traffic encryption key state machine when the TEK Grace Time starts, controls the traffic encryption key state machine to go to the Rekey Wait state of (E), and requests a traffic encryption key to be active during the next period from the base station 200 through a Key Request message.

When receiving a Key Reply message (8) including a traffic encryption key from the base station in the Rekey Wait state of (E), the subscriber station 100 controls the traffic encryption key state machine to go to the Operational state of (D), thereby allowing normal data transmission using the traffic encryption key.

In this instance, the process of maintaining the Operational state of (D) because of the received Key Reply message of (8) during the Operational state of (D) is only applicable to the multicast service or the broadcast service according to the first embodiment.

Further, the traffic encryption key state machine can go to the Op Reauth Wait state of (C) and the Rekey Reauth Wait state of (F) which will not be described since they are well known to a person skilled in the art.

Figure 23:
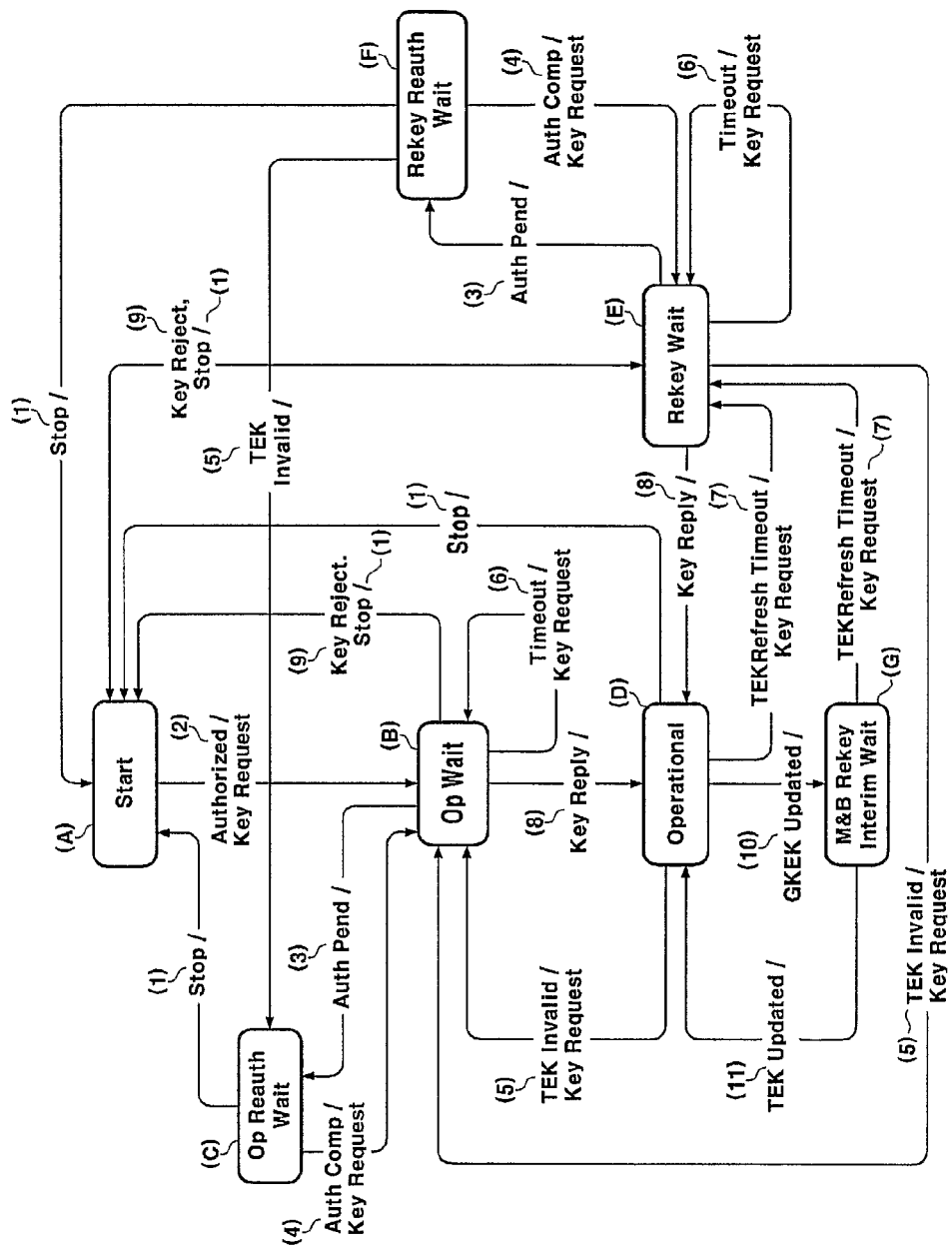
FIG. 23 shows a state transition diagram of a traffic encryption key state machine of a subscriber station in a method for managing a traffic encryption key in a wireless portable Internet system according to the second exemplary embodiment of the present invention.

FIG. 23 shows a state transition diagram of a traffic encryption key state machine of a subscriber station in a method for managing a traffic encryption key in a wireless portable Internet system according to the second exemplary embodiment of the present invention, and FIG. 24 shows a table for the state transition shown in FIG. 23.

Referring to FIGS. 23 and 24, the process in which the traffic encryption key state machine initially receives the traffic encryption key from the base station 200 and stands by in the Operational state of (D) in the second embodiment corresponds to that of the first embodiment.

When receiving a Key Update Command message of the GKEK update mode from the base station 200 before the M&B TEK Grace Time while the traffic encryption key state machine stays in the Operational state of (D), the subscriber station 100 generates a GKEK Updated event of (10) to the traffic encryption key state machine, and the traffic encryption key state machine goes to the M&B Rekey Interim Wait state of (G) and waits for a new traffic encryption key.

The base station 200 transmits a Key Update Command message of the TEK update mode to the subscriber station through a broadcast connection after the M&B TEK Grace Time, and the subscriber station 100 receives the Key Update Command message, generates a TEK Updated event of (11) to the traffic encryption key state machine, and controls the traffic encryption key state machine to go to the Operational state of (D).

However, when failing to normally receive the Key Update Command message from the base station 200 in the M&B Re-key Interim Wait state of (G) as shown in FIG. 19, the subscriber station 100 generates a TEK Refresh Timeout event of (7) to the traffic encryption key state machine when the TEK Grace Time starts, controls the traffic encryption key state machine to go to the Re-key Wait state of (E), and requests a traffic encryption key to be active during the next period from the base station 200 through a Key Request message.

When failing to receive a Key Update Command message of the GKEK update mode from the base station 200 in the Operational state of (D), the subscriber station 100 generates a TEK Refresh Timeout event of (7) to the traffic encryption key state machine when the TEK Grace Time starts, controls the traffic encryption key state machine to go to the Re-key Wait state of (E), and requests a traffic encryption key to be active during the next period from the base station 200 through a Key Request message.

When receiving the Key Reply message (8) including the traffic encryption key from the base station 200 in the Re-key Wait state of (E) because of the above-noted two cases, the subscriber station 100 controls the traffic encryption key state machine to go to the Operational state of (D).

In this instance, the transition to the M&B Re-key Interim Wait of (G) from the Operational state of (D) because of generation of the GKEK Updated event of (10), the transition to the Re-key Wait state of (E) from the M&B Re-key Interim Wait of (G) because of generation of the TEK Refresh Timeout event of (7), and the transition to the Operational state of (D) because of generation of the TEK Updated event of (11) are applicable to the multicast service or the broadcast service according to the second embodiment.

In addition, the traffic encryption key state machine can go to the Op Reauth Wait state of (C) and the Re-key Reauth Wait state of (F) which will not be described since they are well known to a person skilled in the art.

The above-described method for managing the traffic encryption key for the multicast service or the broadcast service in the wireless portable Internet system according to the exemplary embodiments of the present invention provides the subsequent advantages.

First, the traffic encryption key for the multicast service and the broadcast service is updated and distributed with a lesser radio resource since the base station updates the traffic encryption key and transmits the traffic encryption key to the currently-serviced subscriber stations through the broadcast connection.

Second, since the base station automatically updates the traffic encryption key for the multicast service and the broadcast service and distributes the traffic encryption key to the subscriber stations, the base station uses no Key Request message provided by the subscriber stations but distributes the traffic encryption key to the subscriber stations through a single Key Reply message or two Key Update Command messages, thereby reducing TEK processing data.

Third, the base station can safely distribute the KEK or GKEK since the base station encrypts the KEK or GKEK with an Authorization Key of respective subscriber stations and individually transmits them to the subscriber stations.

Fourth, the subscriber stations having received the KEK or GKEK can decrypt the traffic encryption key since the traffic encryption key is encrypted with the KEK or GKEK, when the base station broadcasts the traffic encryption key to all the subscriber stations.

Fifth, the base station can maintain security for the multicast service and the broadcast service and provide security corresponding to the subscriber stations by periodically updating the traffic encryption key.

Sixth, each multicast service is secured since each multicast service has a different SA, in particular, a different traffic encryption key.

Seventh, since each service provider manages a specific SA for the broadcast service, a service provider can provide a secure broadcast service.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A method for a base station to manage a traffic encryption key (TEK) for encrypting traffic data for a multicast service or a broadcast service provided to a subscriber station in a wireless portable Internet system, the method comprising: (a) generating a new traffic encryption key so as to update a current traffic encryption key when a predetermined time elapses from a start time of an active lifetime of the current traffic encryption key used for encrypting traffic data currently transmitted to the subscriber station; and (b) transmitting the new traffic encryption key to subscriber stations provided with the multicast service or the broadcast service through a broadcast connection, upon generation of the new traffic encryption key; wherein the predetermined time from the start time is managed by the base station and is less than a second predetermined time from the start time managed by the subscriber station, and wherein expiration of the second predetermined time triggers a request for the new traffic encryption key from the subscriber station when the subscriber station fails to receive the new traffic encryption key, and the base station transmits the new traffic encryption key generated in (a) to the subscriber station in response to the request.

2. The method of claim 1, wherein the predetermined time is established to be a time which is prior to an expiration time of an active lifetime of the current traffic encryption key by a multicast & broadcast (M&B) TEK Grace Time based on the M&B TEK Grace Time managed by the base station.

3. The method of claim 1, wherein in (b), a Key Reply message included in a Privacy Key Management Response (PKM-RSP) message is used to transmit the new traffic encryption key to the subscriber station through the broadcast connection.

4. The method of claim 1, wherein in (a), the new traffic encryption key is encrypted by the current traffic encryption key through the 3-Data Encryption Standard (3-DES) or Advanced Encryption Standard (AES).

5. The method of claim 1, wherein the method further comprises, before (a): (i) receiving a request on a traffic encryption key for a multicast service or a broadcast service from the subscriber station so as to initially receive the multicast service or the broadcast service; and (ii) generating a requested traffic encryption key and transmitting the generated traffic encryption key to the subscriber station, wherein message transmission between the base station and the subscriber station is performed through a Primary Management Connection.

6. The method of claim 5, wherein the traffic encryption key generated in (ii) is encrypted using the 3-Data Encryption Standard (3-DES) or Advanced Encryption Standard (AES), and is encrypted by a Key Encryption Key (KEK) generated by an Authentication Key (AK) of the subscriber station.

7. The method of claim 1, wherein in (b), an active lifetime of the new traffic encryption key starts when the new traffic encryption key is transmitted to the subscriber station to update the current traffic encryption key and the active lifetime of the current traffic encryption key expires.

8. The method of claim 1, wherein the base station transmits the current traffic encryption key and the new traffic encryption key to the subscriber stations having initially requested the traffic encryption key, when receiving the request on the traffic encryption key from the subscriber station after the predetermined time elapses from the start time of the active lifetime of the current traffic encryption key.

9. The method of claim 8, wherein the traffic encryption key request and transmission generated after the predetermined time is performed by each base station and subscriber station through the Primary Management Connection.

10. The method of claim 1, wherein the base station transmits the new traffic encryption key to the subscriber stations having requested the traffic encryption key, when receiving a request on the traffic encryption key from the subscriber station so as to update the current traffic encryption key while the subscriber station receives the multicast service or the broadcast service after the predetermined time elapses from the start time of the active lifetime of the current traffic encryption key.

11. A method for a base station to manage a traffic encryption key (TEK) for encrypting traffic data for a multicast service or a broadcast service provided to a subscriber station in a wireless portable Internet system, the method comprising: (a) generating a specific key for encrypting or decrypting a traffic encryption key before a predetermined time elapses from a start time of an active lifetime of the current traffic encryption key used for encrypting traffic data currently transmitted to the subscriber station; (b) transmitting the specific key to subscriber stations receiving the multicast service or the broadcast service through a primary management connection; (c) generating a new traffic encryption key so as to update the current traffic encryption key when the predetermined time elapses from a start time of an active lifetime of the current traffic encryption key; and (d) transmitting the new traffic encryption key to subscriber stations receiving the multicast service or the broadcast service through a broadcast connection upon generation of the new traffic encryption key, to update a traffic encryption key used by the subscriber station; wherein the predetermined time from the start time is managed by the base station and is less than a second predetermined time from the start time that is managed by the subscriber station, and wherein expiration of the second predetermined time triggers a request for the new traffic encryption key from the subscriber station when the subscriber station fails to receive the new traffic encryption key, and the base station transmits the new traffic encryption key generated in (c) to the subscriber station in response to the request.

12. The method of claim 11, wherein in (b), the specific key is a Group Key Encryption Key (GKEK) distributed to the subscriber stations served with the multicast service or the broadcast service.

13. The method of claim 12, wherein the GKEK is encrypted by the Authorization Key (AK) of the subscriber station served with the multicast service or the broadcast service.

14. The method of claim 12, wherein the GKEK managed for each multicast service or the broadcast service is randomly generated by the base station or an Authentication Authorization and Accounting (AAA) server for accessing the base station and authenticating the subscriber.

15. The method of claim 14, wherein the base station randomly generates the GKEK when the range of the multicast service or the broadcast service covers a base station.

16. The method of claim 14, wherein the AAA server randomly generates the GKEK when the range of the multicast service or the broadcast service covers the wireless portable Internet system.

17. The method of claim 11, wherein the method further comprises, before (a): (i) receiving a request on a traffic encryption key for a multicast service or a broadcast service from the subscriber station so as to initially receive the multicast service or the broadcast service; and (ii) generating a requested traffic encryption key and transmitting the generated traffic encryption key to the subscriber station, wherein message transmission between the base station and the subscriber station is performed through a Primary Management Connection.

18. The method of claim 17, wherein a Key Reply message included in a privacy Key Management Response (PKM-RSP) message is used to transmit the generated traffic encryption key in (ii) to the subscriber station, and the Key Reply message includes the specific key for encrypting the traffic encryption key.

19. The method of claim 11, wherein in (c), the new traffic encryption key is encrypted through the 3-Data Encryption Standard (3-DES) or Advanced Encryption Standard (AES), and is encrypted by a specific key transmitted to the subscriber station in (b).

20. The method of claim 11, wherein in (d), an active lifetime of the new traffic encryption key starts when the new traffic encryption key is transmitted to the subscriber station to update the current traffic encryption key and the active lifetime of the current traffic encryption key expires.

21. A method for a subscriber station to manage a traffic encryption key (TEK) for decrypting traffic data for a multicast service or a broadcast service received from a base station in a wireless portable Internet system, the method comprising: (a) receiving a new traffic encryption key from the base station through a broadcast connection; and (b) updating a current traffic encryption key with the new traffic encryption key, and using the new traffic encryption key to decrypt traffic data received from the base station; wherein expiration of a predetermined time from a start time of an active lifetime of the current traffic encryption key triggers transmission of the new traffic encryption key from the base station, wherein expiration of a second predetermined time from the start time triggers a request for the new traffic encryption key from the subscriber station when the subscriber station fails to receive the new traffic encryption key from the base station, and the subscriber station receives the new traffic encryption key that is transferred from the base station in response to the request, and wherein the predetermined time is managed by the base station and is less than the second predetermined time from the start time that is managed by the subscriber station.

22. A method for a subscriber station to manage a traffic encryption key (TEK) for decrypting traffic data for a multicast service or a broadcast service received from a base station in a wireless portable Internet system, the method comprising: (a) receiving a new specific key for decrypting a traffic encryption key from the base station through a Primary Management Connection, the new specific key being encrypted with an Authorization Key (AK) allocated when the subscriber station is authenticated; (b) updating a current specific key with the new specific key; (c) receiving a new traffic encryption key from the base station through a broadcast connection, the new traffic encryption key being encrypted with the new specific key; and (d) decrypting the new traffic encryption key with the new specific key to update the current traffic encryption key, and using the updated traffic encryption key to decrypt traffic data received from the base station;

wherein expiration of a predetermined time from a start time of an active lifetime of the current traffic encryption key triggers transmission of the new traffic encryption key from the base station, wherein expiration of a second predetermined time from the start time triggers a request for the new traffic encryption key from the subscriber station when the subscriber station fails to receive the new traffic encryption key from the base station, and the subscriber station receives the new traffic encryption key that is transferred from the base station in response to the request, and wherein the predetermined time is managed by the base station and is less than the second predetermined time from the start time that is managed by the subscriber station.

23. The method of claim 22, wherein the subscriber station receives the new specific key from the base station before the second predetermined time elapses from the start time of the active lifetime of the current traffic encryption key, and receives the new traffic encryption key therefrom after the second predetermined time elapses from the start time thereof.

24. The method of claim 21, wherein the subscriber station receives the new traffic encryption key from the base station after the second predetermined time elapses from the start time of the active lifetime of the current traffic encryption key.

25. The method of claim 24, wherein the second predetermined time is established to be a time which is prior to an expiration time of an active lifetime of the current traffic encryption key by a multicast & broadcast (M&B) TEK Grace Time based on the M&B TEK Grace Time managed by the base station.

26. The method of claim 25, wherein the subscriber station requests no traffic encryption key update when receiving the new traffic encryption key from the base station through the broadcast connection before the first predetermined time elapses.

27. The method of claim 26, wherein the first predetermined time is established based on a TEK Grace Time managed by the subscriber station, and is established to be a time which is prior to an expiration time of the active lifetime of the current traffic encryption key by the TEK Grace Time.

28. The method of claim 27, wherein the M&B TEK Grace Time is established to be greater than the TEK Grace Time.

29. The method of claim 25, wherein the method comprises: when the subscriber station receives no new traffic encryption key from the base station through the broadcast connection until the first predetermined time expires, requesting the new traffic encryption key from the base station through a Primary Management Connection and receiving the new traffic encryption key so as to update the current traffic encryption key; and updating the current traffic encryption key with the new traffic encryption key, and using the new traffic encryption key to decrypt traffic data received from the base station.

30. The method of claim 24, wherein an active lifetime of the new traffic encryption key starts when the active lifetime of the current traffic encryption key expires after the current traffic encryption key is updated with the new traffic encryption key.

31. A method for configuring a protocol for managing a traffic encryption key (TEK) for encryption or decryption of traffic data for a multicast service or a broadcast service transmitted and received between a subscriber station and a base station in a wireless portable Internet system, the method comprising: (a) the subscriber station using a MAC message to transmit a Key Request message to the base station and request a traffic encryption key; (b) the base station using the MAC message to transmit a Key Reply message including the requested new traffic encryption key and a specific key to the subscriber station, the specific key being encrypted with an Authorization Key allocated to the subscriber station and being used to encrypt the traffic encryption key; (c) the base station using the MAC message to transmit the first Key Update Command message including a new specific key to the subscriber station so as to update the specific key; and (d) the base station using the MAC message to transmit the second Key Update Command message including a new traffic encryption key encrypted by the new specific key to the subscriber station; wherein the new specific key and the new traffic encryption key are transmitted in accordance with a predetermined time from a start time of an active lifetime of the traffic encryption key, wherein the predetermined time is managed by the base station and is less than a second predetermined time from the start time that is managed by the subscriber station, and wherein expiration of the second predetermined time triggers a request for the new traffic encryption key from the subscriber station when the subscriber station fails to receive the new traffic encryption key from the base station, and the subscriber station receives the new traffic encryption key that is transferred from the base station in response to the request.

32. The method of claim 31, wherein in (a), the subscriber station transmits the Key Request message included in a Privacy Key Management Request (PKM-REQ) message to the base station through a Primary Management Connection.

33. The method of claim 31, wherein in (b), the subscriber station transmits the Key Reply message included in a Privacy Key Management Response (PKM-RSP) message to the base station through a Primary Management Connection.

34. The method of claim 33, wherein the specific key includes a Group Key Encryption Key (GKEK) distributed to the subscriber stations served with the multicast service or the broadcast service, and is included in TEK-parameters included in the Key Reply message.

35. The method of claim 31, wherein in (c) and (d), the first Key Update Command message is transmitted through a Primary Management Connection, the second Key Update Command message is transmitted through a broadcast connection, and the first Key Update Command message and the second Key Update Command message include: a Key-Sequence-Number parameter; a security association identification (SA-ID) parameter; a Key Push Modes parameter for identifying the first and second Key Update Command messages; a Key Push Counter for preventing replay attacks on the Key Update Command message; TEK-parameters relevant to the traffic encryption key; and an HMAC-Digest for authenticating the first and second Key Update Command messages.

36. The method of claim 35, wherein the TEK-parameters included in the first Key Update Command message include the GKEK and a traffic encryption key sequence number.

37. The method of claim 35, wherein the TEK-parameters included in the second Key Update Command message include the new traffic encryption key, a Key-Lifetime of the new traffic encryption key, a Key-Sequence-Number, and a Cipher Block Chaining Initialization Vector (CBC-IV) for functioning as an input key for encrypting traffic data.

38. The method of claim 35, wherein when an HMAC authentication key needed as an input key for generating the HMAC-Digest is generated for a downlink; the Secure Hash Algorithm (SHA) is used to generate the HMAC authentication key; a downlink HMAC_PAD_D and a Key Push Counter are used as input keys in the first and second Key Update Command messages; and an authentication key allocated for each subscriber station is used as another input key for the first Key Update Command message authentication, and a GKEK transmitted through the first Key Update Command message is used as another input key for the second Key Update Command message authentication.

39. An operation method of a traffic encryption key state machine provided to a subscriber station and used for the subscriber station to manage a traffic encryption key (TEK) for decrypting traffic data received from a base station for a multicast service or a broadcast service, the operation method comprising: transmitting a Key Request message to the base station according to generation of a traffic encryption key request event and then entering an Op Wait state; and controlling an Operational state being able to receive the traffic data from the base station, wherein the traffic encryption key state machine goes to the Operational state and starts a predetermined operation when the subscriber station in an Op Wait state receives a Key Reply message including a new traffic encryption key from the base station, expiration of a first predetermined time from a start time of an active lifetime of a current traffic encryption key triggers transmission of the new traffic encryption key from the base station, expiration of a second predetermined time from the start time triggers a request for the new traffic encryption key from the subscriber station when the subscriber station fails to receive the new traffic encryption key from the base station, and the subscriber station receives the new traffic encryption key that is transferred from the base station in response to the request, and the predetermined time is managed by the base station and is less than the second predetermined time from the start time that is managed by the subscriber station.

40. The operation method of claim 39, wherein the method further comprises: using the new traffic encryption key generated and transmitted by the base station according to a request of the subscriber station, and waiting for a re-key (a Re-key Wait state), wherein the subscriber station transmits a Key Request message to the base station according to a generation of a TEK Refresh Timeout event and the traffic encryption key state machine goes to the Re-key Wait state when the subscriber station fails to receive the Key Reply message for distribution of the new traffic encryption key from the base station in the Operational state.

41. The operation method of claim 40, wherein the traffic encryption key state machine receives the Key Reply message including the new traffic encryption key from the subscriber station in response to the Key Request message by the base station in the Re-key Wait state, and goes to the Operational state.

42. An operation method of a traffic encryption key (TEK) state machine existing in a subscriber station and used for the subscriber station to manage a traffic encryption key for decrypting traffic data received from a base station for a multicast service or a broadcast service, the operation method comprising: transmitting a Key Request message to the base station according to generation of a traffic encryption key request event and then entering an Op Wait state; controlling an Operational state to receive the traffic data from the base station; and controlling a Multicast and Broadcast (M&B) Re-key Interim Wait state to momentarily wait for by using a new traffic encryption key automatically generated and transmitted by the base station, wherein the traffic encryption key state machine goes to the Operational state and starts a predetermined operation when a Key Reply message event is provided from the base station in the Op Wait state, a Group Key Encryption Key (GKEK) Updated event is generated and the traffic encryption key state machine goes to the M&B Re-key Interim Wait state when a new specific key is provided from the base station through the first Key Update Command message in the Operational state so as to update the specific key, a TEK Updated event is generated and the traffic encryption key state machine goes to the Operational state when the second Key Update Command message for distributing the new traffic encryption key encrypted with the new specific key is transmitted from the base station through a broadcast connection in the M&B Re-key Interim Wait state, expiration of a first predetermined time from a start time of an active lifetime of a current traffic encryption key triggers transmission of the new traffic encryption key from the base station, expiration of a second predetermined time from the start time triggers a request for the new traffic encryption key from the subscriber station when the subscriber station fails to receive the new traffic encryption key from the base station, and the subscriber station receives the new traffic encryption key that is transferred from the base station in response to the request, and the predetermined time is managed by the base station and is less than the second predetermined time from the start time that is managed by the subscriber station.

43. The operation method of claim 42, wherein the method further comprises using the new traffic encryption key generated and transmitted by the base station according to a request by the subscriber station, and waiting for a re-key (a Re-key Wait state), wherein the subscriber station transmits a Key Request message to the base station because of generation of a TEK Refresh Timeout event and the traffic encryption key state machine goes to the Re-key Wait state when failing to receive the first Key Update Command message from the base station and generating no GKEK Updated event in the Operational state.

44. The operation method of claim 43, wherein the subscriber station transmits a Key Request message to the base station because of a generation of a TEK Refresh Timeout event by the subscriber station and the traffic encryption key state machine goes to the Re-key Wait state when failing to receive the second Key Update Command message from the base station and generating no TEK Updated event in the M&B Re-key Interim Wait state.

45. The operation method of claim 43, wherein the traffic encryption key state machine receives the new traffic encryption key and a Key Reply message including a new specific key for decrypting the new traffic encryption key from the subscriber station in response to the Key Request message by the base station in the Re-key Wait state, and goes to the Operational state.

* * * * *